(12) United States Patent
Wada et al.

(10) Patent No.: US 8,502,893 B2
(45) Date of Patent: Aug. 6, 2013

(54) IMAGING APPARATUS, FLASH DETERMINATION METHOD, AND RECORDING MEDIUM

(75) Inventors: Noriaki Wada, Hyogo (JP); Yutaka Furukawa, Osaka (JP)

(73) Assignee: Panasonic Corporation, Osaka (JP)

( * ) Notice: Subject to any disclaimer, the term of this patent is extended or adjusted under 35 U.S.C. 154(b) by 431 days.

(21) Appl. No.: 12/828,595

(22) Filed: Jul. 1, 2010

(65) Prior Publication Data

US 2011/0001849 A1 Jan. 6, 2011

(30) Foreign Application Priority Data

Jul. 3, 2009 (JP) .................................. 2009-158744

(51) Int. Cl.
*H04N 5/217* (2011.01)

(52) U.S. Cl.
USPC ........ 348/241; 348/239; 348/226.1; 348/370; 348/371

(58) Field of Classification Search
USPC .............. 348/234, 226.1, 370–371, 239, 241; 382/254
See application file for complete search history.

(56) References Cited

U.S. PATENT DOCUMENTS

2005/0196045 A1* 9/2005 Zoghlami et al. ............. 382/191
2010/0091141 A1* 4/2010 Martinez et al. .............. 348/234

FOREIGN PATENT DOCUMENTS

JP 2007-306225 11/2007
JP 2007306225 A * 11/2007

* cited by examiner

*Primary Examiner* — Roberto Velez
*Assistant Examiner* — Yih-Sien Kao
(74) *Attorney, Agent, or Firm* — Wenderoth, Lind & Ponack, L.L.P.

(57) ABSTRACT

An imaging apparatus capable of increasing the accuracy of detection of an outside flash of light.
The imaging apparatus includes an imaging unit that sequentially captures images using a CMOS-type image sensor, and a flash determination unit that determines the presence/absence of a flash based on the images captured by the imaging unit. The flash determination unit monitors an amount of change in the average luminance level of a predetermined region in the lower area of the screen in the images captured by the imaging unit, and determines the presence/absence of a flash based on the amount of change in the average luminance level.

11 Claims, 14 Drawing Sheets

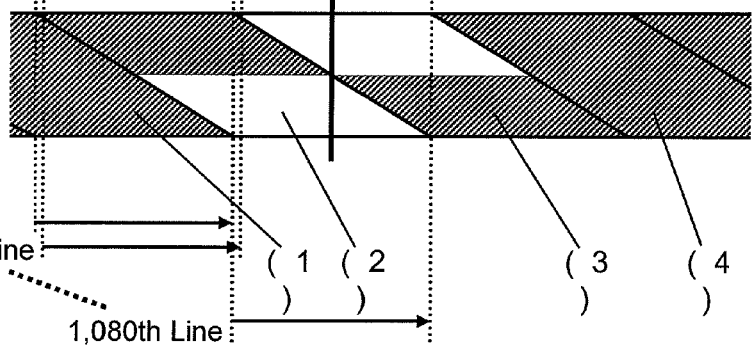
FIG. 7A Vertical Synchronization Signal
FIG. 7B Exposure Timing

1/60th Second

Vertical Synchronization Signal

Image Outputted by Imaging Unit (1) (2) (3) (4) (5)

Signal Outputted by Flash Determination Unit

Image Outputted by Correction Unit (0) (1) (2+3) (2+3) (4)

Total Screen Average Luminance Level
= 20% × 108 ÷ 1080 + 100% × 972 ÷ 1080 = 92%

Total Screen Average Luminance Level
= 20% × 972 ÷ 1080 + 100% × 108 ÷ 1080 = 28%

Block Average Luminance Level = 100% × 64 ÷ 64 = 100%

Block Average Luminance Level = 100% × 64 ÷ 64 = 100%

Block Average Luminance Level = 20% × 44 ÷ 64 + 100% × 20 ÷ 64 = 45%

Y0 Y1 Y2 Y3 Y4 Y5

64 Lines

320 Pixels

Luminance Level 80%
Luminance Level 20%
100%
50%
Moving High-Luminance Object
Moving High-Luminance Object Y0=20% Y1=35% Y2=50%
Y3=50% Y4=35% Y5=20%
Average Value of Y0 to Y5 = 35%

Luminance Level 80%
Luminance Level 20%
Moving High-Luminance Object
Moving High-Luminance Object Y0=20% Y1=60% Y2=80%
Y3=80% Y4=60% Y5=20%
Average Value of Y0 to Y5 = 60%

IMAGING APPARATUS, FLASH DETERMINATION METHOD, AND RECORDING MEDIUM

This application claims priority to Japanese Patent Application No 2009-158744 filed on Jul. 3, 2009, the entire disclosure of which is hereby incorporated herein by reference.

BACKGROUND OF THE INVENTION

1. Technical Field

The technical field relates to an imaging apparatus and a flash determination method, applied in a digital camera, video camera, or the like that captures continuous images, that does not cause the occurrence of band-shaped noise even when there has been an outside flash of light and that is capable of appropriately outputting a frame image at the instant of the flash of light (the time when the outside flash of light has occurred).

2. Description of the Related Art

Video cameras that capture images using CMOS (Complementary Metal-Oxide Semiconductor) image sensors (CMOS image sensors) are increasing as of late. With such a video camera that employs a CMOS image sensor, in the case where there has been an outside flash of light caused by a flash illumination or the like during the capturing of a moving picture, the entire screen does not become bright for the instant corresponding to a single frame; instead, an unnatural image in which the brightness differs between an upper area and a lower area of the screen is outputted. This problem is generally known, as indicated by the descriptions in, for example, Patent Citation 1 (JP2007-306225A), FIG. 3, paragraphs [0059] to [0065].

A drawing will be used to illustrate the cause of an unnatural image in which the brightness differs between an upper area and a lower area of the screen being outputted by an imaging apparatus that employs a CMOS image sensor.

FIG. 7 is a diagram illustrating an exposure timing when an image with a frame frequency of 60 Hz and 1,080 effective scanning lines has been captured using an imaging apparatus that employs a CMOS image sensor, and illustrates the occurrence of a band-shaped high-luminance area when there has been an outside flash of light. With a CMOS image sensor, the exposure timing is shifted from line to line, and thus there is a difference of approximately $\frac{1}{60}$ of a second between the first line in the uppermost area of the screen and the 1,080th line in the lowermost area of the screen. Here, when there is an outside flash of light, the influence of that outside flash of light occurs across the lines exposed as the image of a preceding frame (2) and the lines exposed as the image of a following frame (3). As a result, a frame in which the lower area of the screen is bright occurs and is followed by a frame in which the upper area of the screen is bright in the image (video) outputted from the imaging apparatus. Meanwhile, because the outside flash of light occurs asynchronous to the operation of the imaging apparatus, it is unclear in which line the screen will start to become bright in the image outputted by the imaging apparatus (the captured image).

In response to this problem, where an unnatural image in which the brightness differs between an upper area and a lower area of the screen in the captured image, Patent Citation 1 proposes a method that detects an outside flash of light and, when the outside flash of light has been detected, recording is carried out excluding an unnatural image that has been affected by the outside flash of light.

Meanwhile, an imaging apparatus disclosed in Patent Citation 1 detects an outside flash of light in the manner described hereinafter. The imaging apparatus disclosed in Patent Citation 1 includes a detection unit that detects a brightness, a color distribution, or the like in an image. Information indicating the brightness, the color distribution, or the like in a predetermined area of the image, information indicating a spatial frequency of a predetermined area of the image, or the like is outputted as an evaluation value, and the difference between the evaluation value and an evaluation value of an image for comparison is taken; if the difference is greater than or equal to a reference value, it is determined that an outside flash of light is acting on the image.

However, with video cameras used in news coverage and the like, there are cases where one wishes to record an image at the instant of a flash illumination as well, such as outdoor nighttime scenes where a person is being transported in an automobile as part of a police escort.

In other words, there are cases where, when capturing images with a video camera that employs a CMOS image sensor, one wishes to output a uniformly bright image at the instant of a flash, rather than an unnatural image in which the brightness differs between the upper and lower areas of the image, even when there has been an outside flash of light.

However, when detecting an outside flash of light, the accuracy of the detection poses a problem.

In Patent Citation 1, brightness information of a predetermined area is used as an evaluation value, and the difference between that evaluation value and the evaluation value of an image for comparison is taken; if that difference is greater than or equal to a reference value, a flash detection process is carried out assuming that an outside flash of light is acting on the image. However, there are no discussions as to what specific region within the screen is to be used as the target of the flash detection process. Here, the accuracy of flash detection will be discussed for two cases, or (1) the case where the entire screen is taken as the region to be monitored and the average luminance of the entire screen is employed as the evaluation value, and (2) the case where only a single line in the lowermost area of the screen is taken as the region to be monitored and the average luminance of that line in the lowermost area is employed as the evaluation value.

(1) First, the accuracy of flash detection for the case where the entire screen is taken as the region to be monitored and the average luminance of the entire screen is employed as the evaluation value will be discussed. In the case where imaging is carried out by an imaging apparatus in an environment in which a flash has occurred, the average luminance also increases in the screen in a captured image obtained using the imaging apparatus; however, there are large variations in the increase of this average luminance. As illustrated in FIG. 7, because an outside flash of light occurs asynchronous to the operation of the imaging apparatus, it is unclear in which line the screen will start to become bright in the captured image. As a result, there are cases in which the screen in the captured image brightens starting with an upper area, and cases in which the screen in the captured image brightens from below.

FIGS. 8A and 8B are diagrams illustrating an example in which a screen in a captured image, whose luminance level is at a uniform 20%, experiences an outside flash of light, resulting in the lower area of the screen rising to a luminance level of 100%. FIG. 8A illustrates an example in which 90% of the screen experiences an increase in luminance due to the outside flash of light, whereas FIG. 8B illustrates an example in which 10% of the screen experiences an increase in luminance due to the outside flash of light. Note that "a luminance level of 100%" refers to a level that corresponds to a white peak level as defined by SMPTE (Society of Motion Picture and Television Engineers), the Association of Radio Industries and Businesses Studio Standard, and so on. The level of an image signal that contains a luminance level (a signal value) is expressed as a percentage of this white peak level, which is taken as "100%".

In FIG. 8A, the average luminance for the entire screen is calculated as 92%. Meanwhile, in FIG. 8B, the average luminance for the entire screen is calculated as 28%. In other words, if the average luminance of the entire screen is calculated and taken as the evaluation value even when there is an outside flash of light, the evaluation value (in this case, the average luminance level of the entire screen) will vary greatly, from a level of 28% to a level of 92%, depending on where the line of the high-luminance area starts.

Here, if the reference value for determining a flash in the aforementioned flash detection method is set to a value that is twice the average luminance level of one frame (frame image) previous, according to the aforementioned technique, a flash will be determined to have occurred in the case where the average luminance level of the current frame image (the frame image to be processed) is greater than or equal to 40%. In the case of FIG. 8A, the evaluation value is 92%, and thus a flash can be determined to have occurred according to the aforementioned flash detection method; however, in the case of FIG. 8B, the evaluation value is 28%, and thus a flash is not determined as having occurred according to the aforementioned flash detection method.

Meanwhile, if the reference value for determining a flash is lowered in order to reduce the influence of the first line of high luminance, such as setting the reference value to 1.2 times the average luminance level of the frame (frame image) one frame previous, the average luminance level in the frame image is greater than or equal to 24%, and thus the aforementioned flash detection method determines that a flash has occurred. At this time, according to the aforementioned flash detection method, a flash can be determined to have occurred in both the cases illustrated in FIGS. 8A and 8B; however, the luminance in the screen changes in the captured image (the frame image) during normal imaging, when no flashes occur, due to zoom operations, pan/tilt operations, or when the subject moves, and there is thus the possibility that a flash will mistakenly be detected as having occurred.

As described thus far, with a technique that employs the average luminance of the entire screen in a captured image (a frame image) as the evaluation value and monitors changes in the evaluation value, there are situations where there is no response and no flash is detected as having occurred even when there has been a flash, and situations where a flash is mistakenly detected as having occurred even through no flash has actually occurred.

(2) Next, the accuracy of flash detection of a flash detection method will be discussed for the case where, as opposed to the case described in (1) above, the monitored region is reduced, taking a single line in the lowermost area of the captured image (the frame image) as the monitored region, and employing the average luminance of the single line in the lowermost area as the evaluation value.

In this case, the average luminance of the single line in the lowermost area changes significantly due to movement of the video camera. For example, when a tilt operation is performed in the video camera or the video camera is shaken, a subject (object) that had been captured in the lowermost area of the screen in the captured image (the frame image) moves in the vertical direction, and thus the average luminance of the single line changes greatly. FIG. 8C illustrates an example in which a high-luminance object has entered the frame, moving in an upward direction from the bottom of the screen in the captured image. In the case of FIG. 8C, the average luminance of the line in the lowermost area of the captured image rises suddenly from a level of 20% to a level of 50% between the two frames. In FIG. 8C, the evaluation value of the frame image one frame previous to the current frame is a level of 20%, and thus if, in the flash detection method, the reference value for determining whether a flash has occurred is set to twice the value of the average luminance level of the line in the frame image one frame previous, the average luminance level of the line in the current frame is greater than or equal to 40%, and a flash is determined to have occurred as a result. In other words, in the case of FIG. 8C, the aforementioned flash detection method mistakenly detects a flash as having occurred despite the fact that no outside flash of light actually occurred.

As described thus far, the conventional technique is problematic in terms of the detection accuracy when detecting a flash of light, in that mistaken detections and non-responses occur depending on the region that is set to be monitored for changes in luminance in order to detect flashes.

Having been achieved to solve the aforementioned conventional problem, it is an object of the present invention to achieve an imaging apparatus, a flash detection method, and a recording medium in which a program is recorded, that increase the detection accuracy of an outside flash of light.

SUMMARY OF THE INVENTION

In order to solve the aforementioned problems, an imaging apparatus according to the present invention includes an imaging unit and a determination unit.

The imaging unit includes a CMOS-type image sensor and obtains an image by converting light from a subject into an electrical signal. The determination unit sets a predetermined region in the lower portion of the image obtained by the imaging unit as a flash detection monitoring region, calculates an evaluation value from the flash detection monitoring region, and determines that the influence of a flash is present within the image when the calculated evaluation value has changed by greater than or equal to a predetermined value.

According to the present invention, it is possible to achieve an imaging apparatus, a flash detection method, and a recording medium in which a program is recorded, that are capable of reducing the occurrence of mistaken detections of and non-responses to an outside flash of light and are capable of increasing the detection accuracy of an outside flash of light.

BRIEF DESCRIPTION OF THE DRAWINGS

FIGS. 7A and 7B are diagrams illustrating exposure timing in a CMOS image sensor.

DETAILED DESCRIPTION OF THE INVENTION

Embodiments of the present invention will be described hereinafter with reference to the drawings.

First Embodiment

<1.1: Configuration of Imaging Apparatus>

Figure 1:
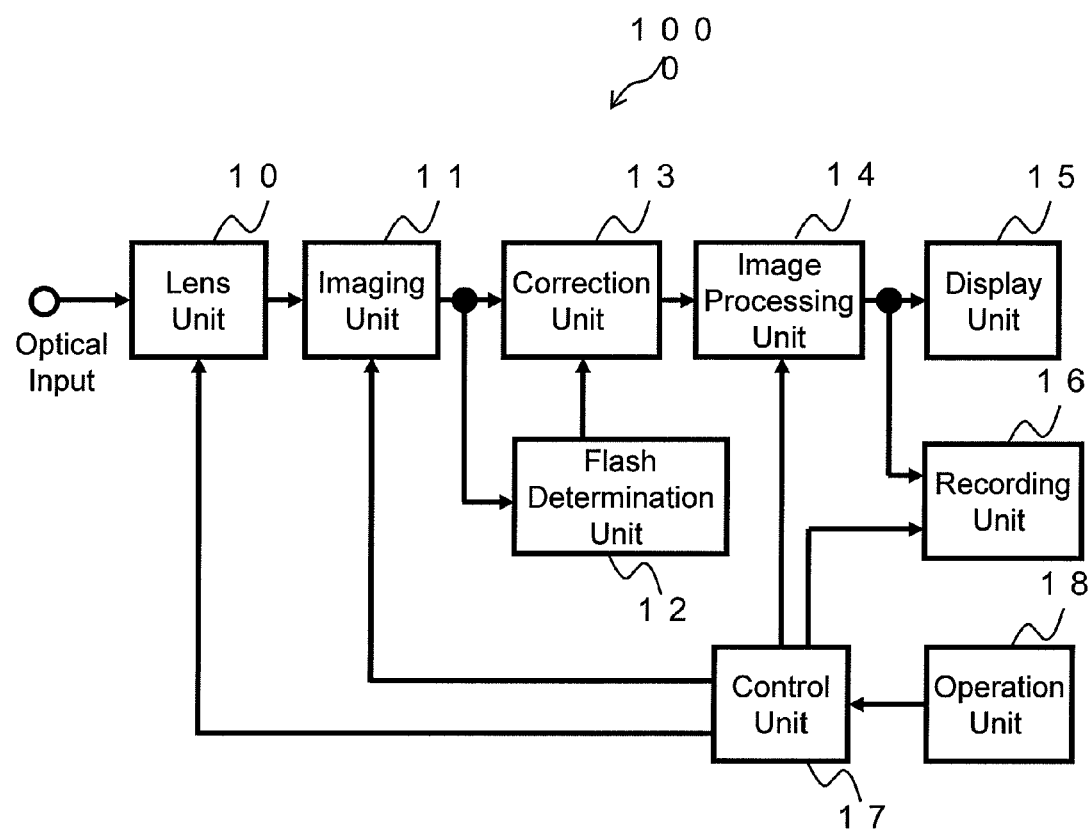
FIG. 1 is a block diagram illustrating an imaging apparatus according to a first embodiment.

FIG. 1 is a block diagram illustrating an imaging apparatus 1000 according to a first embodiment.

As shown in FIG. 1, the imaging apparatus 1000 includes a lens unit 10 that concentrates light from a subject, an imaging unit 11 that obtains an image signal by converting the light from the subject concentrated by the lens unit 10 into an electrical signal, and a flash determination unit 12 that detects the presence/absence of an outside flash of light in the image signal obtained by the imaging unit 11 and outputs the result of the detection as a flash detection signal. The imaging apparatus 1000 also includes a correction unit 13 that carries out a correction process on the image signal outputted by the imaging unit 11 based on the flash detection signal, and an image processing unit 14 that carries out image processing on the output of the correction unit 13. The imaging apparatus 1000 furthermore includes a display unit 15 that displays the image signal outputted from the image processing unit 14, a recording unit 16 that stores the image signal outputted from the image processing unit 14, a control unit 17 that controls the various functional elements of the imaging apparatus 1000, and an operation unit 18 that communicates various types of instructions from a user to the control unit 17.

The lens unit 10 is configured of one or multiple lenses, and concentrates light from a subject, thereby forming an optical image of the subject upon an image sensor in the imaging unit 11. The lens unit 10 has a focus adjustment function, a zoom function, an exposure adjustment function, and so on, and is controlled based on control signals from the control unit 17.

The imaging unit 11 has an image sensor (for example, a CMOS image sensor) and a sensor driving unit, and converts the light from the subject concentrated by the lens unit 10 into an electrical signal through photoelectric conversion, outputting the electrical signal to the flash determination unit 12 and the correction unit 13 as an image signal. The imaging unit 11 captures a continuous image, and outputs progressive scanning image signals that have, for example, 1,080 effective vertical lines, 1,920 effective horizontal pixels, and a frame frequency of 60 Hz.

The flash determination unit 12 is inputted with the image signal outputted by the imaging unit 11, compares images in each of sequential frames (that is, frame images formed by the image signal), and detects the presence/absence of an outside flash of light (detects whether or not there is an image signal in the frame images that has been affected by an outside flash of light). The flash determination unit 12 then outputs a flash detection signal indicating the presence/absence of an external flash of light to the correction unit 13.

The correction unit 13 is inputted with the image signal outputted by the imaging unit 11 and the flash detection signal outputted by the flash determination unit 12. The correction unit 13 carries out a predetermined correction process on the frame images formed by the image signal based on the flash detection signal. The correction unit 13 then outputs the post-correction process image signal to the image processing unit 14.

The image processing unit 14 executes predetermined image processing (such as camera signal processing (for example, white balance processing, gamma processing, conversion into a luminance/chrominance signal, edge enhancement processing, and so on)) on the image signal outputted by the correction unit 13, and outputs the post-image processing image signal to the display unit 15 and the recording unit 16.

The display unit 15 displays the image signal outputted by the image processing unit 14 in a predetermined display format.

The recording unit 16 records the image signal outputted by the image processing unit 14 in a predetermined recording format.

The control unit 17 outputs various types of control signals to the various functional elements of the imaging apparatus 1000, thereby controlling the various functional elements of the imaging apparatus 1000.

The operation unit 18 communicates instructions from a user to the control unit 17.

<1.2: Operations of Imaging Apparatus>

Operations of the various elements of the imaging apparatus 1000 configured as described thus far will be described hereinafter.

First, the lens unit 10 is controlled by signals from the control unit 17, and the zoom, focus, and aperture thereof are adjusted; an optical signal (light from a subject) is then supplied to (inputted into) the imaging unit 11.

Figure 2:
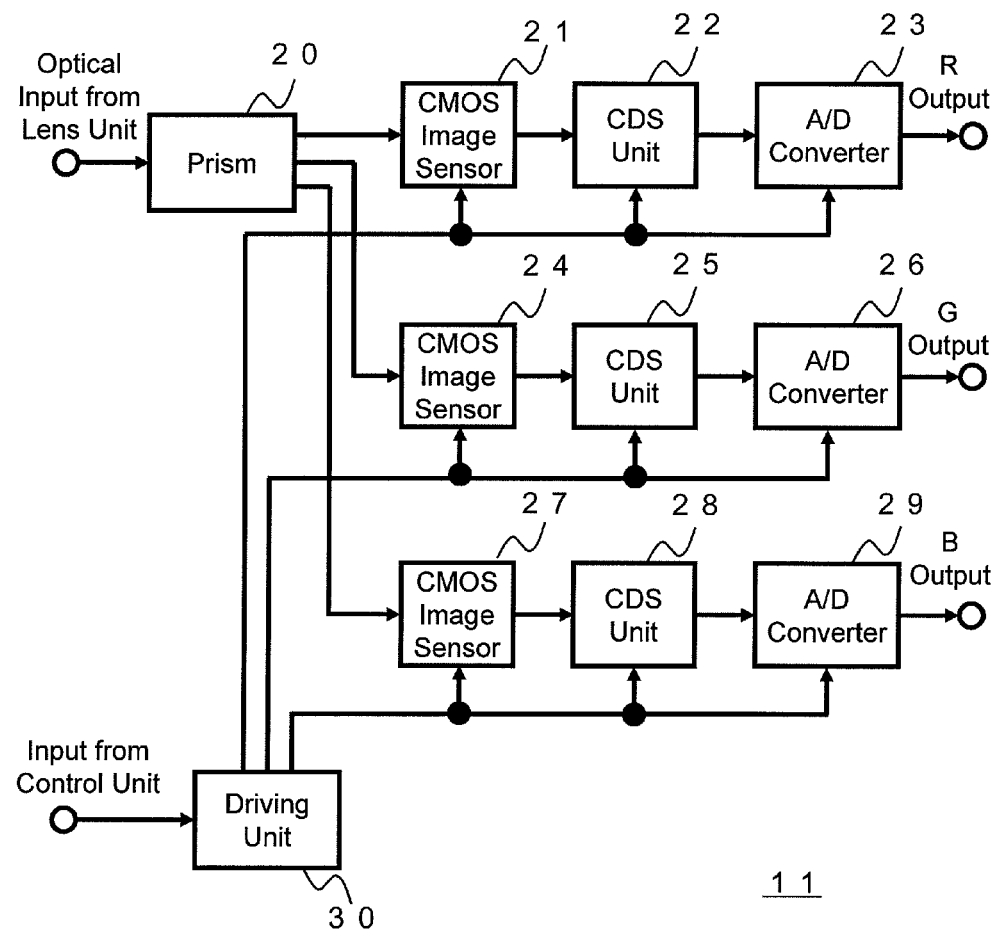
FIG. 2 is a block diagram illustrating an imaging unit according to a first embodiment.

The imaging unit 11 is achieved by, for example, the elements illustrated in the block diagram of FIG. 2. As shown in FIG. 2, the imaging unit 11 includes a prism 20, CMOS image sensors 21, 24, and 27, CDS (Correlated Double Sampling) units 22, 25, and 28, analog/digital converters (A/D converters) 23, 26, and 29, and a driving unit 30.

The optical signal inputted from the lens unit 10 is split by the prism 20 into three signals, or R (a red component), G (a green component), and B (a blue component), and the R signal is inputted into the CMOS image sensor 21, the G signal is inputted into the CMOS image sensor 24, and the B signal is inputted into the CMOS image sensor 27.

The CMOS image sensors 21, 24, and 27 are each controlled by signals supplied by the driving unit 30; each CMOS image sensor receives incident light and accumulates a charge in each of its pixels. Then, the CMOS image sensors 21, 24, and 27 each output electrical signals corresponding to the charges obtained through photoelectric conversion to the CDS units 22, 25, and 28 as image signals. In the present embodiment, the CMOS image sensors 21, 24, and 27 are provided with photodiodes in each of the active pixels in 1,920 horizontal pixels and 1,080 lines on the vertical, and the electrical signals (image signals) of all of the pixels (that is, one frame image's worth) are outputted every 1/60 of a second.

The CDS units (for example, CDS circuits) 22, 25, and 28 are controlled by signals from the driving unit 30, and remove a noise component from the analog electrical signals supplied from the respective CMOS image sensors 21, 24, and 27 by performing a correlated double sampling process thereupon. The CDS units 22, 25, and 28 then supply the analog electrical signals from which the noise has been removed to the analog/digital converters 23, 26, and 29.

The analog/digital converters 23, 26, and 29 are controlled by clock signals from the driving unit 30, and convert the analog electrical signals into digital signals. The signals converted into digital signals by the analog/digital converters 23, 26, and 29 are then respectively outputted to the analog/digital converters 23, 26, and 29 as an R component image signal (R component video signal), a G component image signal (G component video signal), and a B component image signal (B component video signal).

As described thus far, with the imaging unit 11, an inputted optical signal is converted into digital video signals of three colors, or R, and B; pixel data of 1,080 lines on the vertical of 1,920 horizontal pixels is then outputted as a single frame every 1/60 of a second.

Next, the flash determination unit 12 will be described.

Figure 3:
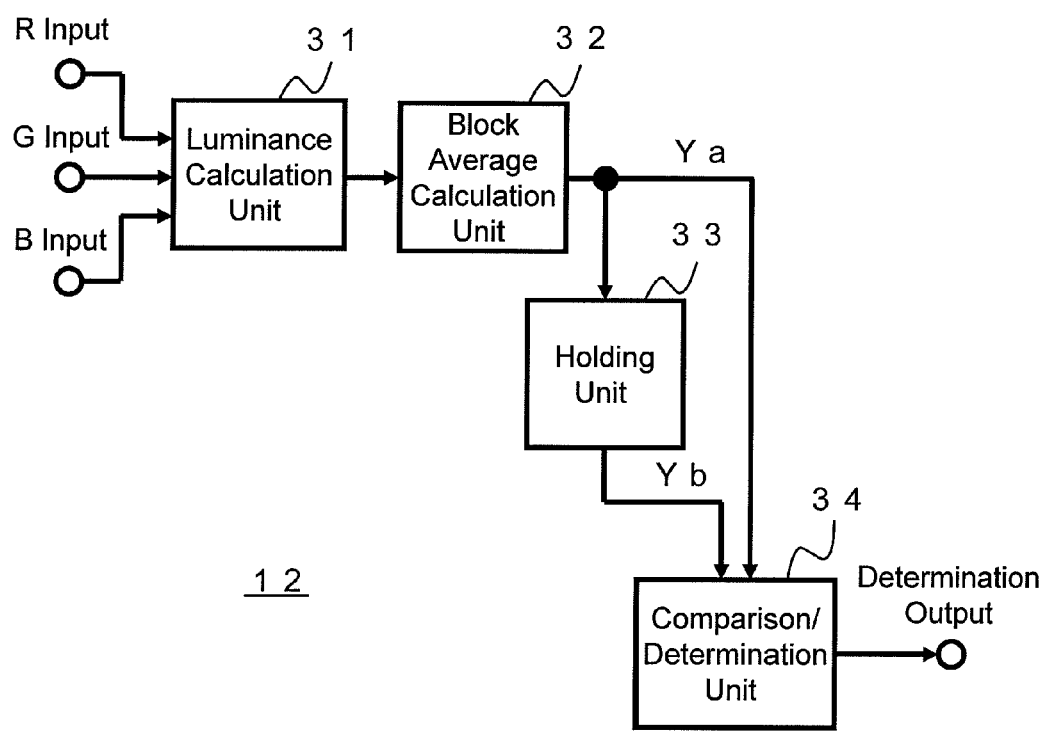
FIG. 3 is a block diagram illustrating a flash determination unit according to a first embodiment.

The flash determination unit 12 is achieved by, for example, the configuration illustrated in the block diagram of FIG. 3. As shown in FIG. 3, the flash determination unit 12 includes a luminance calculation unit 31, a block average calculation unit 32, a holding unit 33, and a comparison/determination unit 34.

The luminance calculation unit 31 computes luminance signals for each pixel from the inputted R, G, and B, digital video signals (that is, each pixel of the image formed by the digital signals), and outputs the computer luminance signals of the pixels to the block average calculation unit 32.

The block average calculation unit 32 sets 64 lines in the lowermost area of the screen in a single frame image as a region to be monitored based on the luminance signals of the pixels as inputted from the luminance calculation unit 31, and calculates an average luminance level of all of the pixels in that region. The block average calculation unit 32 then outputs the result of the calculation as a block average luminance level Ya to the holding unit 33 and the comparison/determination unit 34 on a frame-by-frame basis.

The holding unit 33 holds a block average luminance level outputted per frame from the block average calculation unit 32 for a time equivalent to one frame (that is, 1/60 of a second), and outputs this to the comparison/determination unit 34 as Yb.

The comparison/determination unit 34 compares the block average luminance level Ya inputted by the block average calculation unit 32 and Yb inputted by the holding unit 33, and outputs a determination result on a frame-by-frame basis. To be more specific, the comparison/determination unit 34 outputs "1" as the determination result when the equation $Ya \geq Yb*2$ is fulfilled, and outputs "0" in all other cases.

Next, the correction unit 13 will be described.

Figure 4:
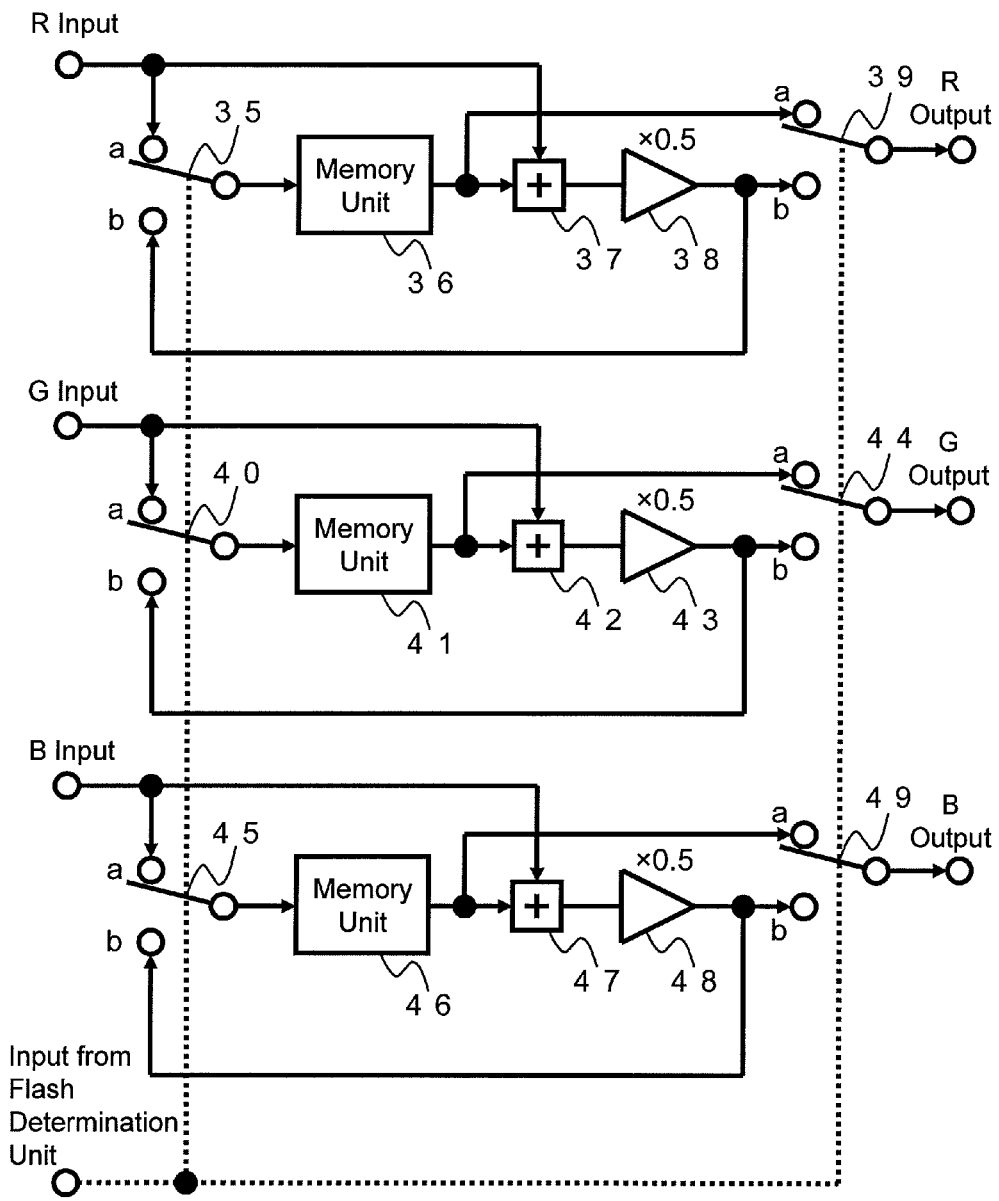
FIG. 4 is a block diagram illustrating a correction unit according to a first embodiment.

The correction unit 13 is achieved by, for example, the configuration illustrated in the block diagram of FIG. 4.

As shown in FIG. 4, the correction unit 13 includes selectors 35, 40, 45, 39, 44, and 49, memory units 36, 41, and 46 that store one frame's worth of the signals from each pixel and delay those signals by an amount of time equivalent to one frame (1/60 of a second), adders 37, 42, and 47, and multipliers 38, 43, and 48 that multiply by 0.5 times.

With the selectors 35, 40, and 45 and the selectors 39, 44, and 49, terminals a are selected when the signals inputted by the flash determination unit 12, or in other words, the flash determination results, are "0", and the terminals b are selected when the flash determination results are "1".

Here, when the flash determination results are "0", the R, G, and B video signals inputted into the correction unit 13 are respectively inputted into the memory units 36, 41, and 46 via the selectors 35, 40, and 45, and are delayed by one frame as a result. The respective R, G, and B video signals that have been delayed by one frame are then outputted to the image processing unit 14 via the selectors 39, 44, and 49, respectively.

On the other hand, when the flash determination results are "1", the R, G, and B video signals inputted into the correction unit 13 are respectively inputted into the adders 37, 42, and 47, and the signals that have been delayed by one frame are added. The respective results of the adding are multiplied by 0.5 by the multipliers 38, 43, and 48. Because the result of the adding is multiplied by 0.5, the result is the calculation of an arithmetic mean. The results of this arithmetic mean are outputted to the image processing unit 14 via the selectors 39, 44, and 49, respectively. At the same time, the output of the multipliers 38, 43, and 48, which is the results of the arithmetic mean, are respectively inputted to the memory units 36, 41, and 46 via the selectors 35, 40, and 45.

In the case where a flash determination result of "1" is obtained for the current frame (frame to be processed) and a flash determination result of "0" is obtained for the next frame, a video (image signal) that has undergone the arithmetic mean is outputted by the correction unit 13 in the frame for which the flash determination result is "1"; however, in the next frame, the video (image signal) stored in the memory units 36, 41, and 46 is outputted by the correction unit 13, and thus video (an image) of the same frame is outputted for two sequential frames.

This operation will be explained with reference to FIG. 9.

FIG. 9 is a timing chart illustrating images outputted by the correction unit 13.

(b) in FIG. 9 illustrates images outputted by the imaging unit 11, and a white band is present in the lower area of the screen in a frame (2). The block average luminance has risen in the region of 64 lines in the lowermost area of the screen in the frame (2), and thus "1" is outputted by the flash determination unit 12 as the flash determination result. The signal outputted by the flash determination unit 12 is indicated in (c) of FIG. 9, and a signal indicating a flash determination result of "1" is outputted immediately after the frame (2). As shown in (d) of FIG. 9, the image outputted by the correction unit 13 has been delayed by one frame as compared to (b) in FIG. 9, and thus a corrected image on which the arithmetic mean process has been carried out (that is, a frame image on which the correction process has been executed) appears (is outputted by the correction unit 13) across two frames, or at the time when "1" is outputted by the flash determination unit 12 as the flash determination result, and during the frame immediately thereafter.

As shown in (b) of FIG. 9, when there has been an outside flash of light, a white band occurs across two consecutive frames in the image outputted by the imaging unit, or to be more specific, in the frames (2) and (3). This white band occurs across the two sequential frames because the period in which the CMOS image sensors 21, 24, and 27 are exposed to the outside flash of light and accumulate charges is split between (spans across) the period corresponding to the frames (2) and (3). Accordingly, with the imaging apparatus 1000, a signal in which all of the pixels are exposed to the same outside flash of light and accumulate charges can be generated by finding the arithmetic mean of the signals of each of the pixels in the frames (2) and (3), and thus a corrected image (corrected frame image) in which the entire screen is bright can be obtained.

Next, the operation of the image processing unit 14 will be described.

The image processing unit 14 performs a while balance adjustment process on inputted R, G, and B video signals, carries out gamma processing, a process for conversion into luminance/chrominance signals, and edge enhancement processing, and outputs luminance/chrominance video signals.

The video signals outputted by the image processing unit 14 are outputted to the display unit 15 and the recording unit 16.

The display unit 15 displays an image formed by the video signals (image signals) outputted by the image processing unit 14 in, for example, a liquid-crystal panel, and an operator can confirm that displayed image.

The recording unit 16 records an image formed by the video signals (image signals) outputted by the image processing unit 14 in a recording medium such as a semiconductor memory by writing image data thereinto after performing, for example, data compression thereupon.

Buttons, switches, and so on are disposed in the operation unit 18, and operation inputs from an operator, such as zoom, focus, and aperture control, starting/stopping recording, and so on can be made therethrough. Signals of these operation inputs are sent to the control unit 17. The control unit 17 controls the various functional elements of the imaging apparatus 1000 based on the operation input signals.

Next, operations and control procedures of the imaging apparatus 1000 according to the first embodiment will be described using a flowchart.

Figure 13:
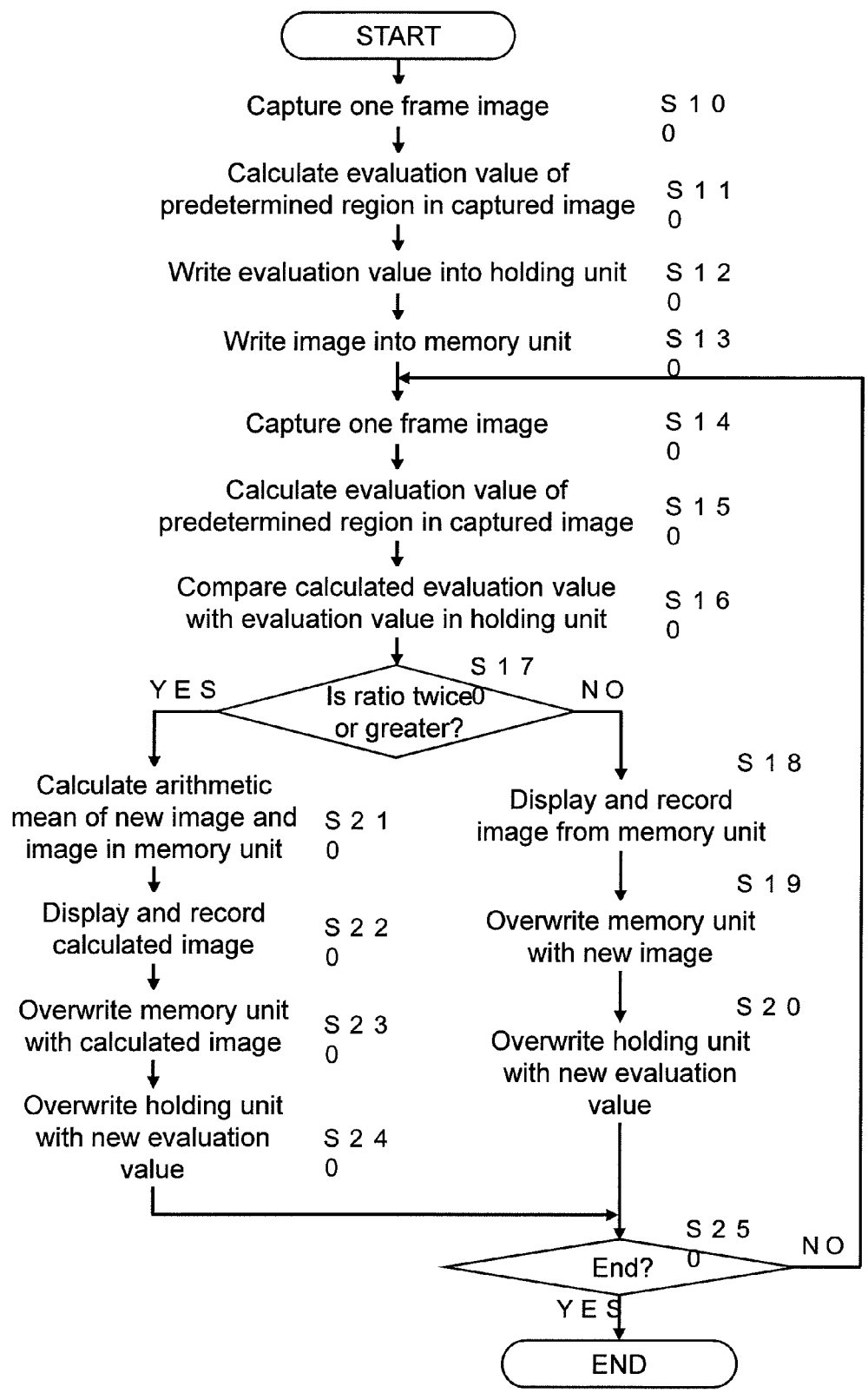
FIG. 13 is a flowchart illustrating processing performed by an imaging apparatus according to a first embodiment.

FIG. 13 is a flowchart illustrating a moving picture capturing process performed by the imaging apparatus 1000 according to the first embodiment.

The imaging apparatus 1000 commences the process (the capturing process) when it has been determined that an operator has manipulated a record button in the operation unit 18 and requested an image to be captured.

First, in step S100, the imaging unit 11 captures one frame's worth of an image (that is, obtains one frame's worth of an image signal).

Next, in step S110, the flash determination unit 12 calculates the block average luminance of 64 lines in the lowermost area of the screen for the captured image (the frame image), and the calculated block average luminance is then taken as an evaluation value.

In step S120, the evaluation value calculated in step 110 is written into the holding unit 33.

In step S130, the image captured by the imaging unit 11 is written into the memory units 36, 41, and 46 within the correction unit 13.

In step S140, an image of the next frame is captured.

In step S150, the flash determination unit 12 calculates the block average luminance of 64 lines in the lowermost area of the screen for the new image, and the calculated block average luminance is then taken as an evaluation value.

In step S160, the new evaluation value calculated (computed) by the flash determination unit 12 and the evaluation value stored in the holding unit 33 are compared to each other.

If in step S170 the result of the comparison in step S160 indicates that the new evaluation value is greater than or equal to twice the evaluation value stored in the holding unit 33, the procedure advances to step S210, whereas if the new evaluation value is less than twice the stored evaluation value, the procedure advances to step S180.

In step S180, the images held in the memory units 36, 41, and 46 are outputted, and are displayed in the display unit 15 along with being recorded by the recording unit 16 in a predetermined format.

Next, in step S190, the newly captured image, or in other words, the image captured in step S140, is used to overwrite the data stored in the memory units 36, 41, and 46.

Then, in step S200, the data of the holding unit 33 is overwritten using the evaluation value calculated (computed) in step S150, and the procedure advances to step S250.

Meanwhile, in step S210, the arithmetic mean of the image captured in step S140 and the image stored in the memory units 36, 41, and 46 is calculated on a pixel-by-pixel basis.

In step S220, the image for which the arithmetic mean was calculated in S210 is displayed in the display unit 15 and is recorded by the recording unit 16 in a predetermined format.

Then, in step S230, the data of the memory units 36, 41, and 46 is overwritten using the image calculated in step S210.

Furthermore, in step S240, the data of the holding unit 33 is overwritten using the new evaluation value calculated in step S150, and the procedure advances to step S250.

In step S250, the processing ends when it has been determined that, for example, the operator has requested the imaging to stop by manipulating a recording stop button in the operation unit 18. However, if it has not been determined that the recording has been requested to stop, the procedure returns to step S140, and the next frame is captured.

<<About Flash Detection Accuracy>>

The accuracy of flash detection performed by the imaging apparatus 1000 according to the first embodiment, which operates as described above, will be discussed.

Figure 10A:
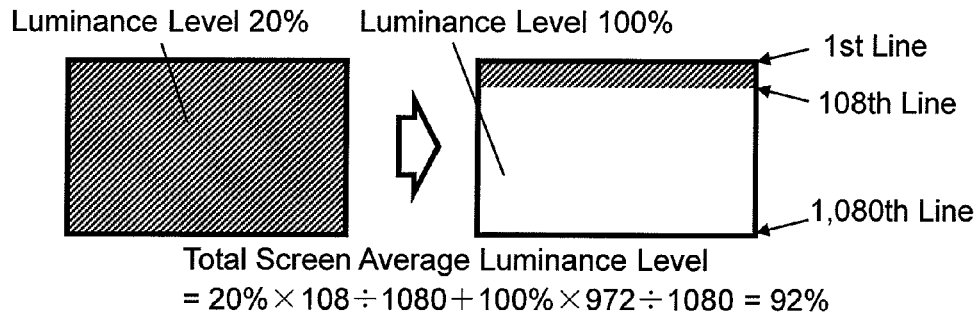
FIGS. 10A through 10E are diagrams illustrating a change in luminance levels when an outside flash of light has occurred, according to a first embodiment.
Figure 10B:
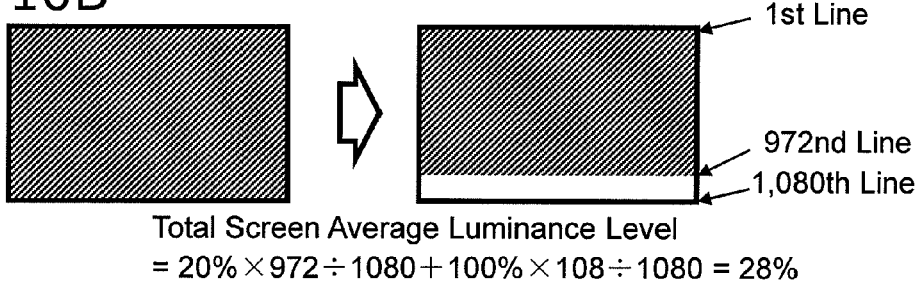

FIGS. 10A and 10B are diagrams illustrating a case in which the average luminance is monitored using the entire screen of a captured image (frame image) as the flash detection region, and a flash is detected (a flash is determined to have occurred) when the average luminance of the current frame image is twice the average luminance of the frame image one frame previous.

FIGS. 10A and 10B illustrate an example in which the luminance level of portions of the screen unrelated to the flash is 20%, whereas the luminance level of the portions that have become bright due to the flash is 100%. FIG. 10A is an example in which a white band caused by a flash (the influence of the flash) starts from the 108th line in the upper portion of the screen of the captured image (frame image), whereas FIG. 10B is an example in which a white band caused by a flash (the influence of the flash) starts from the 972nd line in the lower portion of the screen of the captured image (frame image).

In FIG. 10A, the average luminance level of the entire screen of the captured image (the frame image) is 92%, which is greater than twice the level of 20%, or in other words, is greater than a level of 40%, and thus a flash is detected (a flash is determined to have occurred). However, in FIG. 10B, the average luminance level of the entire screen of the captured image (the frame image) is 28%, which is less than the level of 40%, and thus a flash is not detected (a flash is not determined to have occurred). In other words, in this case, there is no response, and thus a flash cannot be detected.

Figure 10C:
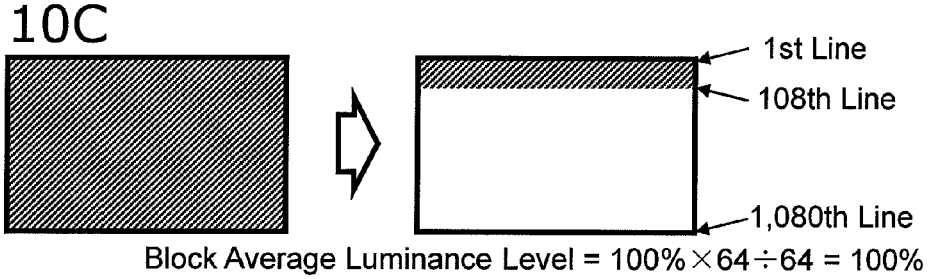
Figure 10D:
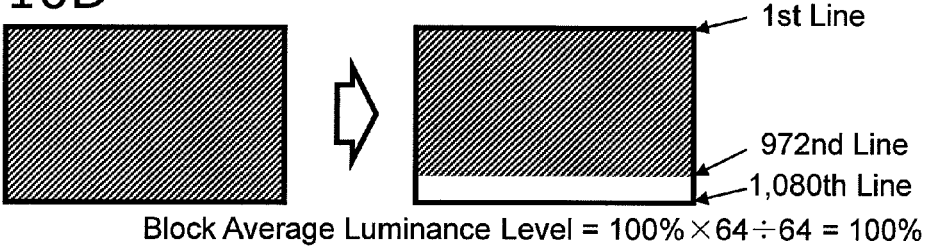
Figure 10E:
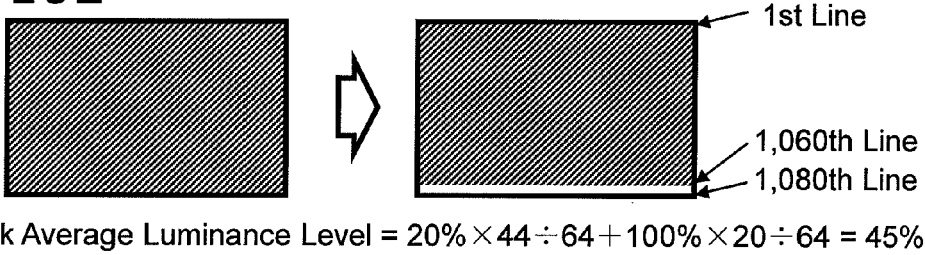

Next, FIGS. 10C, 10D, and 10E are diagrams illustrating a case in which the average luminance is monitored using, as the flash detection region, 64 lines in the lowermost area of the same screen as the imaging apparatus 1000 according to the first embodiment, and a flash is determined to be detected when the average luminance of the current frame image is twice the average velocity of the frame image one frame previous. FIGS. 10C, 10D, and 10E illustrate an example in which the luminance level of portions of the screen in the captured image (frame image) unrelated to the flash is 20%, whereas the luminance level of the portions that have become bright due to the flash is 100%.

FIG. 10C is an example in which a white band caused by a flash starts from the 108th line in the upper portion of the screen in the captured image (the frame image). FIG. 10D, meanwhile, is an example in which a white band caused by a flash starts from the 972nd line in the lower portion of the screen in the captured image (the frame image). FIG. 10E, finally, is an example in which a white band caused by a flash starts from the 1,060th line in the lower portion of the screen in the captured image (the frame image).

In FIG. 10C, the average luminance level of the flash detection region is 100%, which is greater than twice the level of 20%, or in other words, is greater than a level of 40%, and thus a flash is detected (a flash is determined to have occurred).

In FIG. 10D as well, the average luminance level of the flash detection region is 100%, and thus a flash is detected (a flash is determined to have occurred). Furthermore, assuming a white band starting from farther downward in the screen, even if, as shown in FIG. 10E, a white band caused by a flash starts from the 1,060th line in the lower area of the screen in the captured image (the frame image), the average luminance level of the flash detection region is 45% and thus a flash is detected (a flash is determined to have occurred).

As described thus far, the imaging apparatus 1000 according to the first embodiment reduces the occurrence of non-responses in which a flash is not detected despite a flash having actually occurred (that is, mistaken determinations with respect to flash detection), as compared to the case where the average luminance is monitored using the entire screen of the captured image (the frame image) as the flash detection region.

Figure 11A:
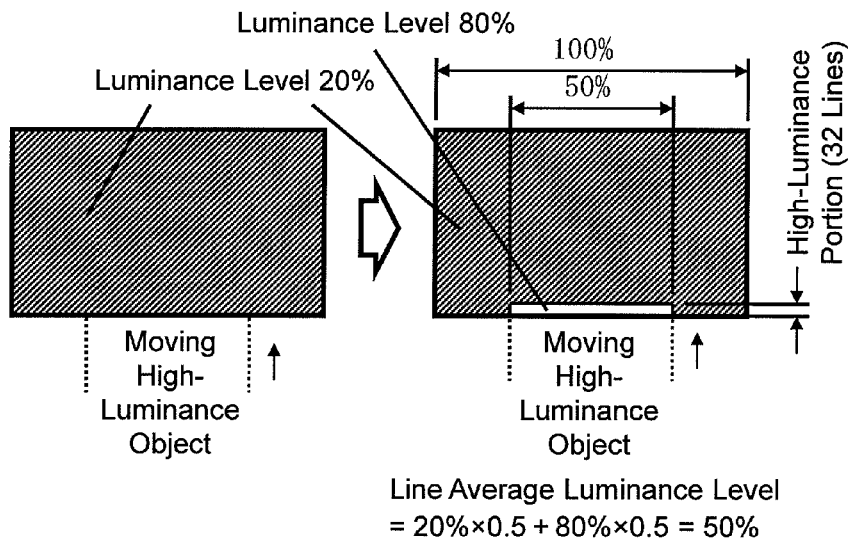
FIGS. 11A and 11B are diagrams illustrating changes in luminance levels caused by a moving high-luminance object, according to a first embodiment.

FIG. 11A is a diagram illustrating a case in which the average luminance of the lines is monitored using a single line in the lowermost area of the screen in a captured image (frame image) as the flash detection region, and a flash is detected (a flash is determined to have occurred) when the average luminance of the current frame image is twice the average luminance of the frame image one frame previous. FIG. 11A is an example in which an object that has a size that is half the length in the horizontal direction of the screen in a frame image and that has a luminance level of 80% has entered the screen, moving from the bottom to the top thereof, and takes up 32 lines' worth of the screen, where the normal luminance level of the screen is 20%.

In the case of FIG. 11A, the single line in the lowermost area of the screen in the captured image (the frame image) is employed as the flash detection region, and thus the monitored line average luminance rises from a level of 20% (the line average luminance level of the frame image one frame previous to the current frame) to a level of 50% (the line average luminance level of the current frame image). In this case, the line average luminance level of the current frame image (the line average luminance level of the single line in the lowermost area of the screen) has exceeded twice the line average luminance level of the frame image one frame previous (the line average luminance level of the single line in the lowermost area of the screen), or in other words, has exceeded a level of 40%, and thus a mistaken detection, in which it is determined that a flash has occurred, is made.

Figure 11B:
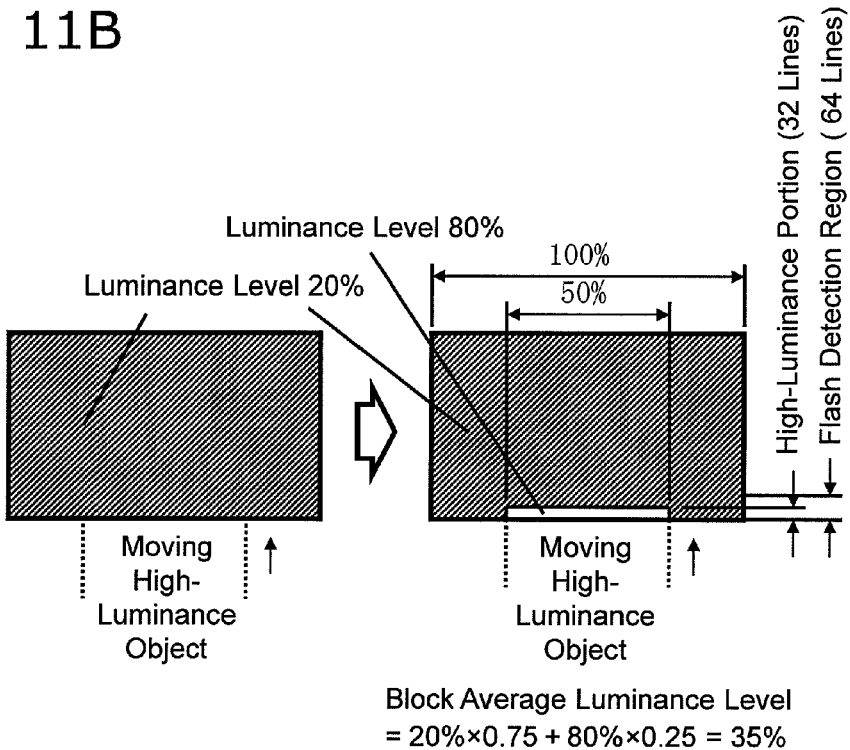

FIG. 11B is a diagram illustrating the flash detection accuracy of the flash detection method employed by the imaging apparatus 1000 according to the first embodiment. In other words, FIG. 11B is a diagram illustrating a case in which the average luminance is monitored using 64 lines in the lowermost area of the screen in a captured image (frame image) as the flash detection region, and it is determined that a flash has been detected (a flash occurred) when the average luminance of the current frame image is twice the average luminance of the frame image one frame previous. FIG. 11B is, like FIG. 11A, an example in which an object that has a size that is half the length in the horizontal direction of the screen in a frame image and that has a luminance level of 80% has entered the screen, moving from the bottom to the top thereof, and takes up 32 lines' worth of the screen, where the luminance level of the screen in the frame image is 20%.

In FIG. 11B, 64 lines in the lowermost area of the screen in the frame image are employed as the flash detection region, and thus the monitored block average luminance rises from a level of 20% (the block average luminance level of the frame image one frame previous to the current frame) to a level of 35% (the block average luminance level of the current frame). In this case, the block average luminance level of the current frame image does not exceed twice the block average luminance level of the frame image one frame previous, or in other words, does not exceed a level of 40%, and thus the imaging apparatus 1000 does not determine that a flash has occurred, and a mistaken detection is not made.

As described thus far, if the average luminance is monitored employing the entire screen of the frame image as the flash detection region, non-responses, in which a flash cannot be detected despite a flash actually occurring (mistaken determinations of a flash detection), occur, but with the imaging apparatus 1000 according to the first embodiment, non-responses (mistaken determinations of a flash detection) can be reduced. In addition, when the line average luminance is monitored employing only a single line in the lowermost area of the screen in a frame image as the flash detection region, mistaken detections are made due to sensitive responses to the movement of a subject; however, with the imaging apparatus 1000 according to the first embodiment, mistaken detections can be reduced, and the flash detection accuracy can be improved as a result.

As described thus far, with the imaging apparatus 1000 according to the first embodiment, a flash detection region of 64 lines in the lowermost area of the screen in a frame image is provided, and the block average luminance is monitored; the block average luminance of the current frame image is then compared to the block average luminance of the frame one frame previous, and when the block average luminance of the current frame image has become greater than or equal to twice the block average luminance of the frame one frame previous, it is determined that a flash has been detected (that a flash has occurred). Through this, with the imaging apparatus 1000, the occurrence of mistaken detections, non-responses, and so on in the flash detection can be reduced. In addition, with the imaging apparatus 1000, an output image is generated by finding the arithmetic mean on a pixel-by-pixel basis for the images of two sequential frames in which there has been a flash (two sequential frames that have been affected by a flash). Through this, the image outputted by the imaging apparatus 1000 is not an unnatural image in which the brightness differs between an upper area and a lower area of the screen, and is instead an image that is uniformly bright at the instant of the flash (that is, a natural image in which it can be recognized that a flash has occurred).

The imaging apparatus 1000 according to the present embodiment has been described assuming the case where a flash detection region of 64 lines in the lowermost area of the screen in a frame image is provided, the block average luminance is monitored, the block average luminance of the current frame image is then compared to the block average luminance of the frame one frame previous, and when the block average luminance of the current frame image has become greater than or equal to twice the block average luminance of the frame one frame previous, it is determined that a flash has been detected (that a flash has occurred); however, it should be noted that the invention is not limited thereto, and in the imaging apparatus 1000, the flash detection region setting may be changed to 32 lines, 128 lines, or the like in the lowermost area of the screen in the frame image. In this case too, mistaken detections can be reduced compared to the case where the flash detection region is set as a single line in the lowermost area. Furthermore, even if a flash is determined to be detected (a flash is determined to have occurred) when the block average luminance of the current frame is greater than or equal to 1.5 times the block average luminance of the frame one frame previous, non-responses are nevertheless reduced more than the case where flashes are detected by monitoring the average luminance of the entire screen of the frame image, and thus the flash detection accuracy is improved.

Meanwhile, although with the imaging apparatus 1000 according to the present embodiment, the CMOS image sensors 21, 24, and 27 of the imaging unit 11 have an active number of pixels equivalent to 1,080 lines on the vertical of 1,920 horizontal pixels, the image sensors are not limited thereto, and image sensors having different pixel numbers may be employed.

In addition, although the prism 20 and three CMOS image sensors 21, 24, and 27 are employed as the imaging unit 11 in the present embodiment, the imaging unit 11 is not limited thereto, and, for example, a single-plate type CMOS image sensor, in which a color film is disposed upon an image sensor chip, may be employed instead.

Furthermore, although a progressive scanning video having a frame frequency of 60 Hz is handled and recorded into the recording unit 16 in the present embodiment, the invention is not limited thereto, and a frame frequency of 50 Hz, 24 Hz, or the like may be employed instead. In addition, with the imaging apparatus 1000, conversion from progressive scanning to interlace scanning may be carried out, and the video may then be recorded as an interlace scanning video.

Second Embodiment

Next, a second embodiment will be described with reference to the drawings.

<2.1: Configuration of Imaging Apparatus>

Figure 5:
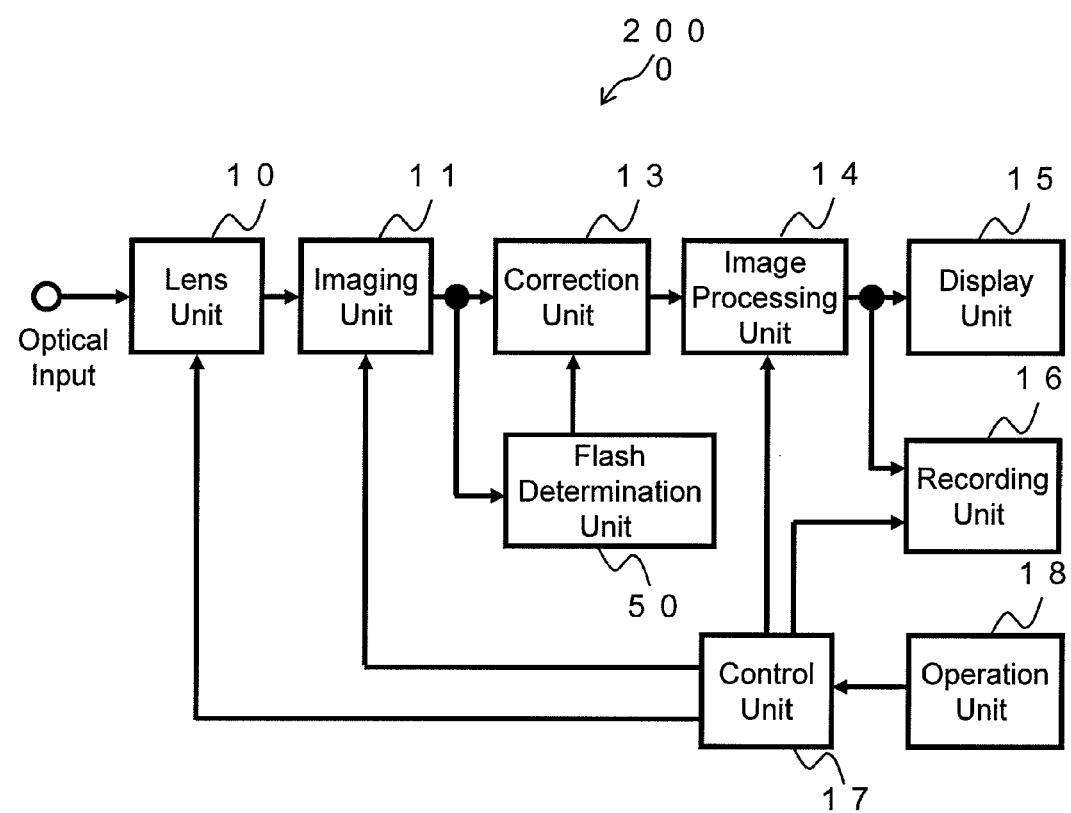
FIG. 5 is a block diagram illustrating an imaging apparatus according to a second embodiment.

FIG. 5 is a block diagram illustrating an imaging apparatus 2000 according to the second embodiment.

As shown in FIG. 5, the imaging apparatus 2000 according to the second embodiment is configured in the same manner as the imaging apparatus 1000 of the first embodiment, but with a flash determination unit 50 in place of the flash determination unit 12. Note that in the present embodiment, elements that are identical to those of the first embodiment are assigned the same reference numerals, and detailed descriptions thereof will be omitted.

<2.2: Operations of Imaging Apparatus>

Operations of the imaging apparatus 2000 configured as described above will be described hereinafter.

The operations of the lens unit 10, the imaging unit 11, the correction unit 13, the image processing unit 14, the display unit 15, the recording unit 16, the control unit 17, and the operation unit 18 are the same as in the imaging apparatus 1000 of the first embodiment. The operations of the imaging apparatus 2000 according to the present embodiment differ from the operations of the imaging apparatus 1000 according to the first embodiment in terms of the operations of the flash determination unit 50.

Figure 6:
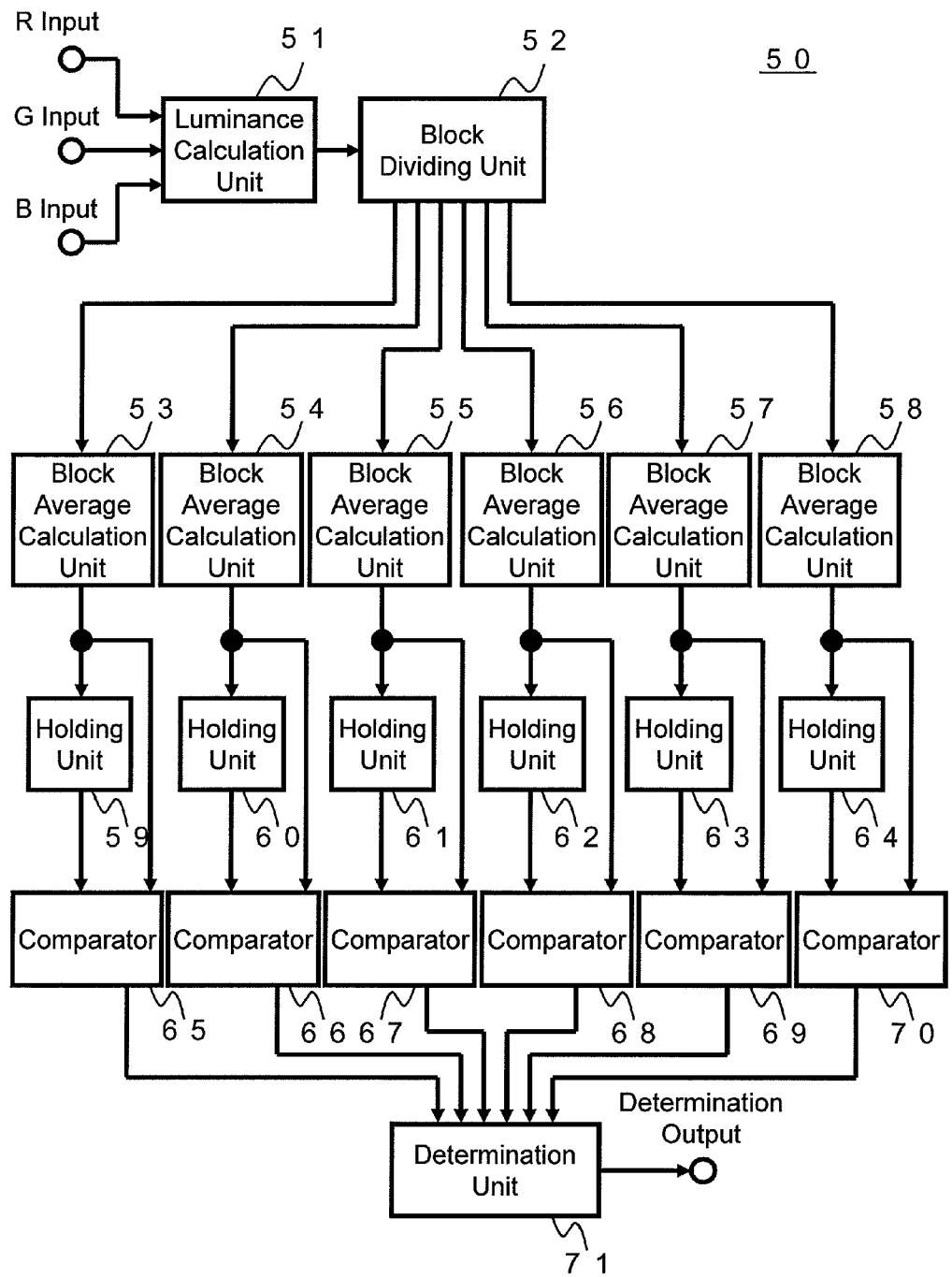
FIG. 6 is a block diagram illustrating a flash determination unit according to a second embodiment.
Figure 8A:
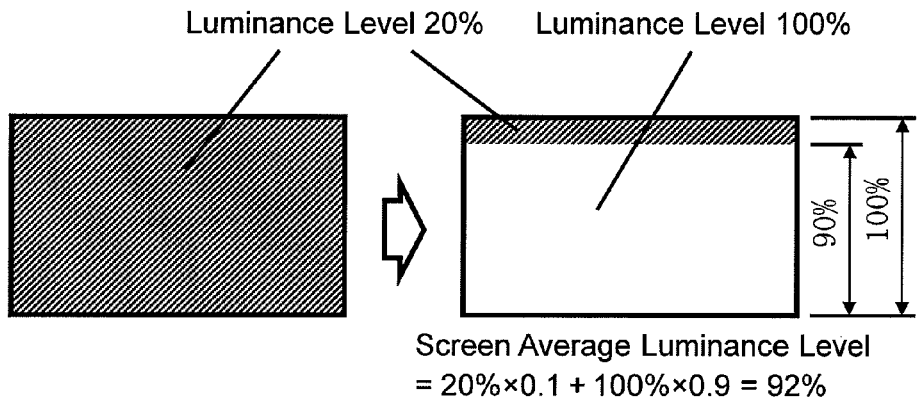
FIGS. 8A through 8C are diagrams illustrating changes in luminance levels in a conventional example.
Figure 8B:
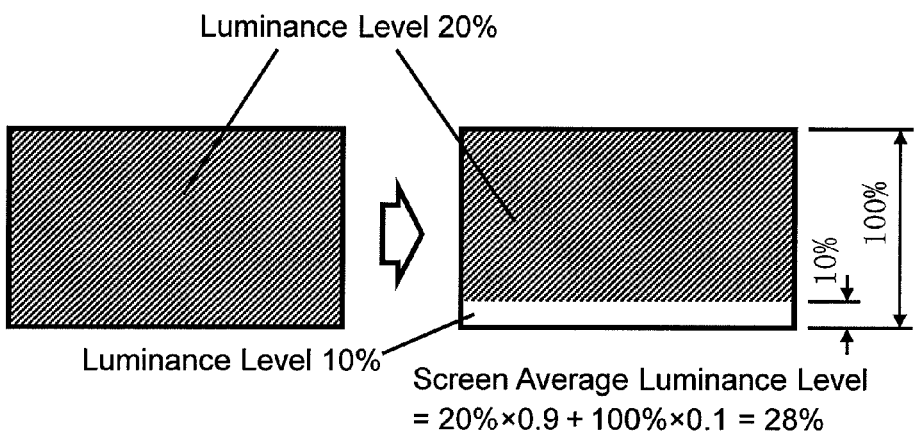
Figure 8C:
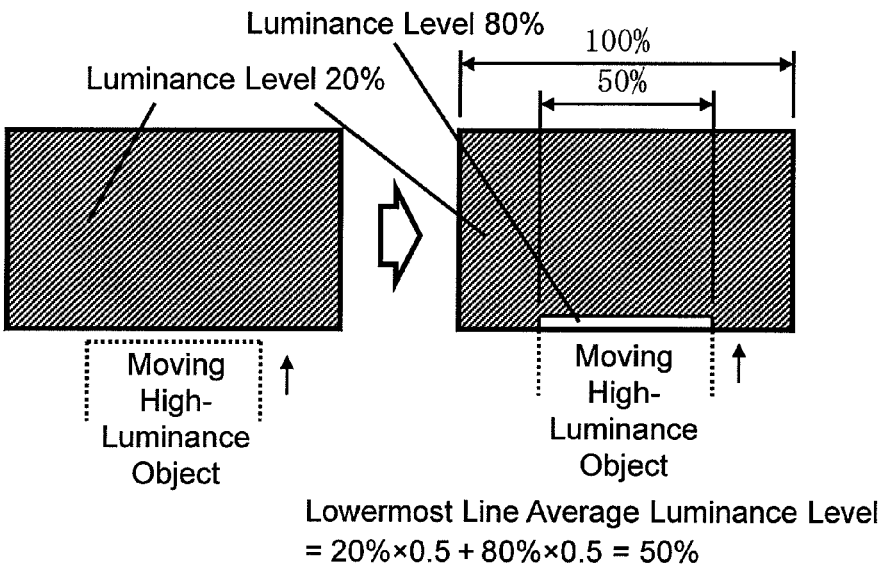
Figure 9A:
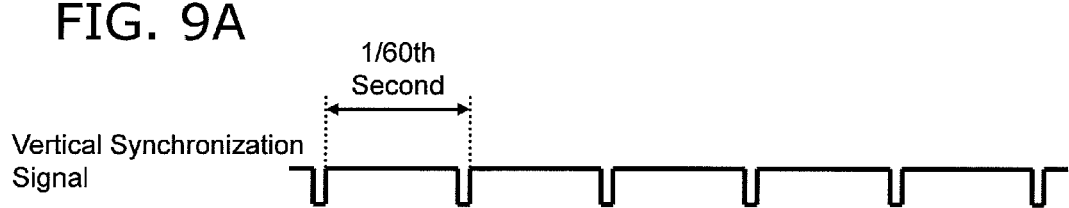
FIGS. 9A through 9D are timing charts illustrating an image outputted by a correction unit according to a first embodiment.
Figure 9B:
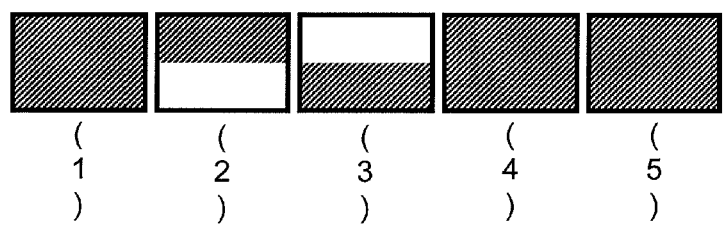
Figure 9C:
Figure 9D:
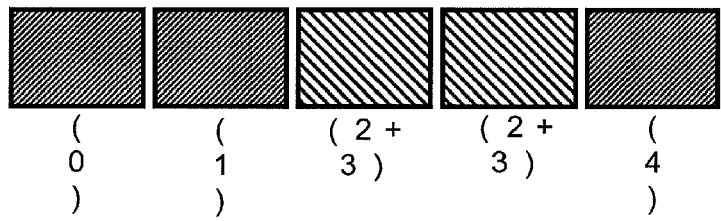

FIG. 6 is a block diagram illustrating details of the flash determination unit 50.

As shown in FIG. 6, the flash determination unit 50 includes a luminance calculation unit 51, a block dividing unit 52 that divides a region of 64 lines in the lowermost area of the screen in a frame image into six regions, block average calculation units 53 to 58 that calculate the average luminance of respective blocks obtained through the division, holding units 59 to 64 that delay the average luminance of respective blocks by one frame, comparators 65 to 70, and a determination unit 71 that determines the presence/absence of a flash.

The luminance calculation unit 51 calculates luminance signals for each of pixels from inputted R, G, and B digital video signals, and outputs the luminance signals to the block dividing unit 52.

Using the inputted luminance signals of each pixel, the block dividing unit 52 divides a region to be monitored that is 1,920 horizontal pixels in 64 lines in the lowermost area of the screen in the frame image into six blocks, with each block having 320 horizontal pixels, and outputs only the luminance signals of the pixels corresponding to the blocks to the block average calculation units 53 to 58, respectively.

The block average calculation units 53 to 58 calculate the average values of the inputted luminance signals, and output average luminance levels for each block on a frame-by-frame basis.

Figure 12A:
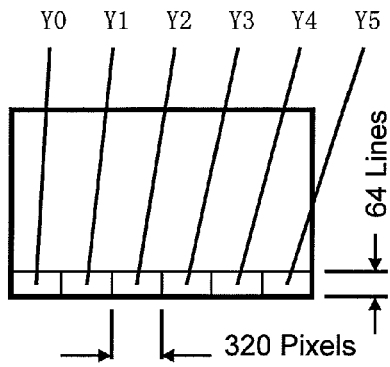
FIGS. 12A through 12C are diagrams illustrating changes in luminance levels caused by a moving high-luminance object, according to a second embodiment.

FIG. 12A is a diagram illustrating a region divided by the block dividing unit 52, and the respective average luminance levels of the six regions within the screen in the frame image are indicated by Y0 to Y5.

The holding units 59 to 64 hold the respective block average luminance levels outputted by the block average calculation units 53 to 58 for an amount of time equivalent to one frame (1/60 of a second), and then output the block average luminance levels.

The comparators 65 to 70 compare the respective block average luminance levels outputted by the block average calculation units 53 to 58 and the block average luminance levels outputted by the holding units 59 to 64, output "1" in the case where the respective block average luminance levels outputted by the block average calculation units 53 to 58 are greater than or equal to twice the block average luminance levels outputted by the holding units 59 to 64, and output "0" when such is not the case.

The determination unit 71 outputs "1" as a determination result when all of the outputs by the comparators 65 to 70 are "1", and outputs "0" in all other cases.

The correction unit 13 performs a correction process based on the output signal of the determination unit 71. The operations of the correction unit 13 are the same as in the imaging apparatus 1000 of the first embodiment.

Next, operations and control procedures of the imaging apparatus 2000 according to the second embodiment will be described using a flowchart.

Figure 14:
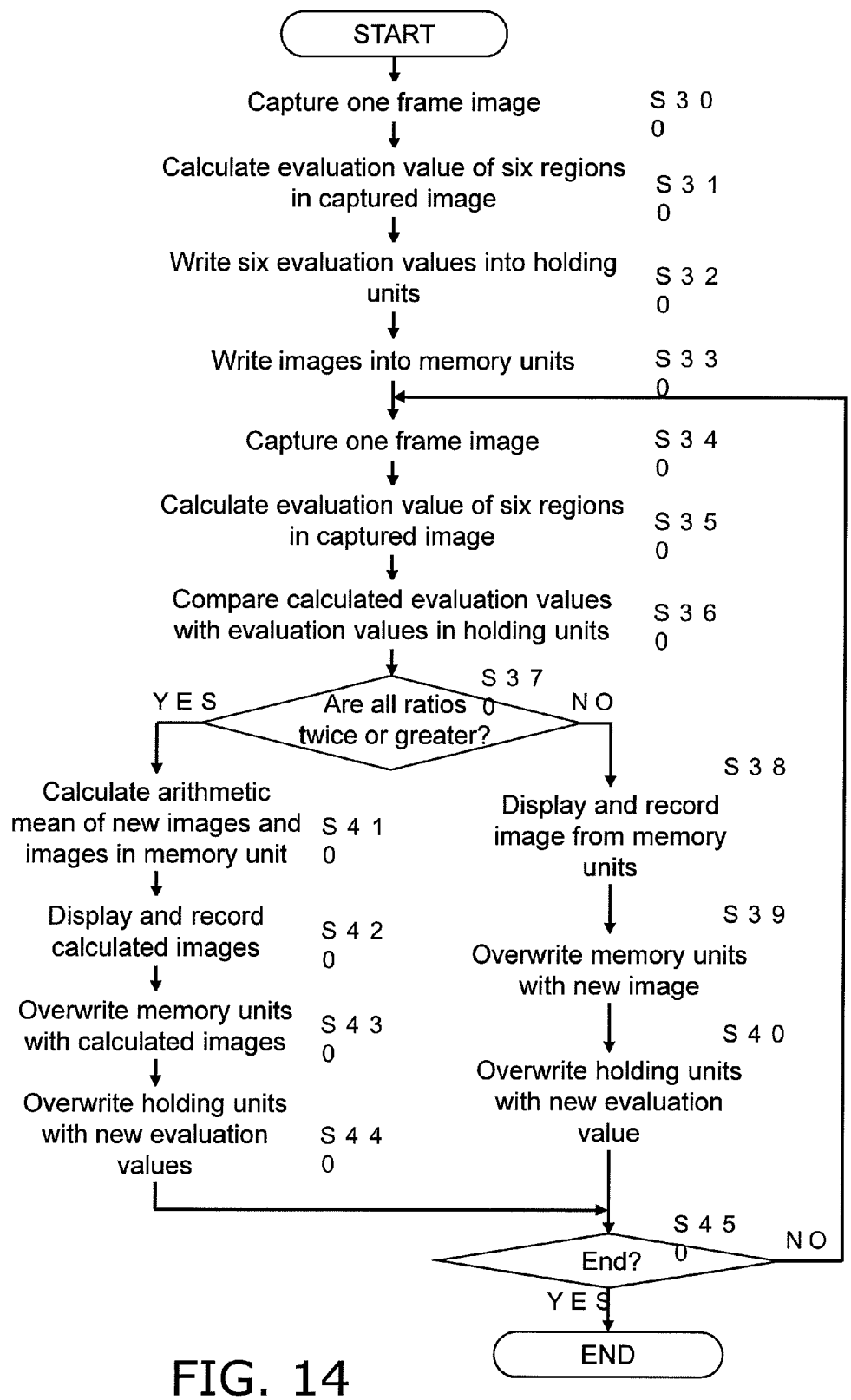
FIG. 14 is a flowchart illustrating processing performed by an imaging apparatus according to a second embodiment.

FIG. 14 is a flowchart illustrating a moving picture capturing process performed by the imaging apparatus 2000 according to the second embodiment. The imaging apparatus 2000 commences the process when it has been determined that an operator has manipulated a record button in the operation unit 18 and requested an image to be captured.

First, in step S300, the imaging unit 11 captures one frame's worth of an image.

Next, in step S310, the flash determination unit 50 divides the lowermost area of the screen in the frame image into six regions and calculates (computes) the average luminance of each block as an evaluation value.

In step S320, the six evaluation values calculated in step S310 (the evaluation values of the blocks) are written into the holding units 59 to 64.

In step S330, the image captured in step S300 is written into the memory units 36, 41, and 46 within the correction unit 13.

In step S340, an image of the next frame is captured.

In step S350, the lowermost area of the screen in the frame image of the new image is divided into six regions, and the average luminance of each block is calculated (computed) as an evaluation value.

In step S360, the six new evaluation values that have been calculated (the evaluation values of the blocks in the current frame) and the evaluation values held in the holding units 59 to 64 (the evaluation values of the blocks in the frame one frame previous to the current frame) are compared.

In step S370, if all six of the new evaluation values are greater than or equal to twice the corresponding evaluation values stored in the holding units 59 to 64, the procedure advances to step S410, whereas if even one of the new evaluation values is less than twice its corresponding evaluation value, the procedure advances to step S380.

In step S380, the images accumulated in the memory units 36, 41, and 46 are outputted and displayed in the display unit 15, and are recorded by the recording unit 16 as well.

Next, in step S390, the newly captured image, or in other words, the image captured in step S340, is used to overwrite the data of the memory units 36, 41, and 46.

Then, in step S400, the data of the holding units 59 to 64 is overwritten using the six evaluation values calculated in step S350, and the procedure advances to step S450.

Meanwhile, in step S410, the arithmetic mean of the image captured in step S340 and the image stored in the memory units 36, 41, and 46 is calculated on a pixel-by-pixel basis.

In step S420, the image for which the arithmetic mean was calculated is displayed in the display unit 15 and is recorded by the recording unit 16.

Then, in step S430, the data of the memory units 36, 41, and 46 is overwritten using the image calculated in step S410.

Furthermore, in step S440, the data of the holding units 59 to 64 is overwritten using the six new evaluation values calculated in step S350, and the procedure advances to step S450.

In step S450, the processing ends when it has been determined that, for example, the operator has requested the imaging to stop by manipulating a recording stop button in the operation unit 18. However, if it has not been determined that the imaging has been requested to stop, the procedure returns to step S340, and the next frame is captured.

<<About Flash Detection Accuracy>>

The accuracy of flash detection performed by the imaging apparatus 2000 according to the second embodiment, which operates as described above, will be discussed.

First, flash detection when there has been an outside flash of light will be discussed.

The exposure times of pixels belonging to a single line in the image sensor corresponding to a single line in the frame image obtained by the imaging apparatus 2000 are considered the same, or in other words, the electric charge accumulation times for pixels belonging to the same line are considered the same, and thus even if the region to be monitored for a flash is divided into six regions on the horizontal as shown in FIG. 12A, the rise in the luminance level is the same for each of the regions obtained by the dividing in the case where a white band has occurred in the frame image due to the influence of an outside flash of light. Accordingly, as described in the first embodiment using FIGS. 10C, 10D, and 10E, even if the white band starts from the 108th line of the frame image, as in FIG. 10C, the white band starts from the 972nd line of the frame image, as shown in FIG. 10D, or the white band starts from the 1,060th line of the frame image, as shown in FIG. 10E, all of the block average luminosities Y0(N) to Y5(N) in the current frame rise greater than or equal to twice the block average luminosities Y0(N−1) to Y5(N−1) of one frame previous. In other words, all of the following equations (1) through (5) are fulfilled, and thus all of the comparators 65 to 70 output "1"; as a result, the determination unit 71 also outputs "1".

$$Y0(N) \geq 2*Y0(N-1) \quad (1)$$

$$Y1(N) \geq 2*Y1(N-1) \quad (2)$$

$$Y2(N) \geq 2*Y2(N-1) \quad (3)$$

$$Y3(N) \geq 2*Y3(N-1) \quad (4)$$

$$Y4(N) \geq 2*Y4(N-1) \quad (5)$$

Note that Yk(N) (where k is an integer from 0 to 4, and N is a natural number) is the evaluation value (block average luminance) of a division block Yk (a division block from Y0 to Y4) of the Nth frame image, whereas Yk(N−1) is the evaluation value (block average luminance) of a division block Yk (a division block from Y0 to Y4) of the N−1th frame image (the frame image one frame previous to the Nth frame).

In this manner, the imaging apparatus 2000 makes a proper flash detection. With the imaging apparatus 2000, a correction process is then carried out on the frame image in which the flash was detected. In other words, with the imaging apparatus 2000, the occurrence of non-responses (mistaken determination) in which a flash cannot be detected can be improved beyond the case where the average luminance of the entire screen in the frame image is set as the detection region.

Next, a mistaken detection occurring when a high-luminance object enters the screen from the bottom of the frame image and moves toward the top thereof will be discussed.

Figure 12B:
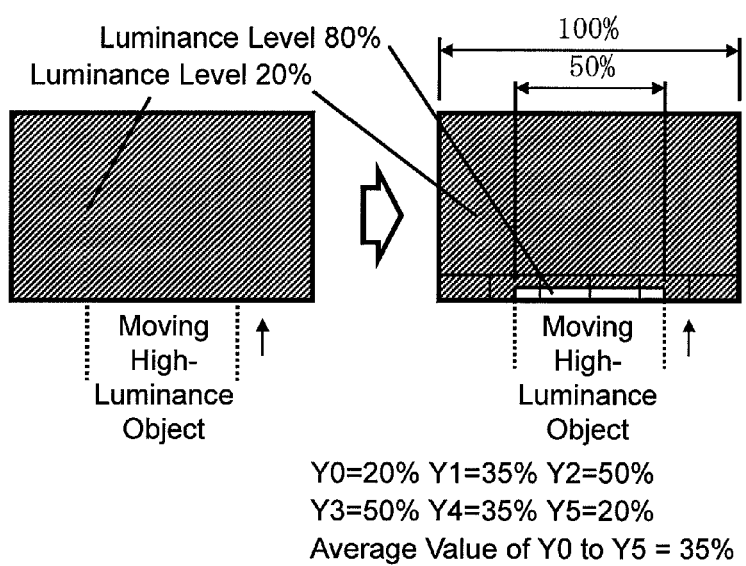
Figure 12C:
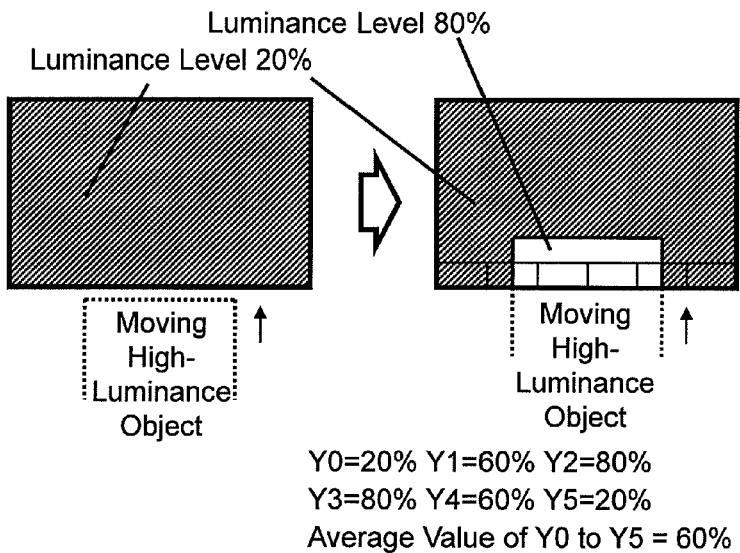

FIGS. 12B and 12C are diagrams illustrating the flash determination performed by the imaging apparatus 2000 according to the second embodiment.

FIG. 12B is an example in which an object that has a size that is half the length in the horizontal direction of the screen and that has a luminance level of 80% has entered the screen, moving from the bottom to the top thereof, and takes up 32 lines' worth of the screen, where the luminance level of the screen in the frame image is 20%. In this case, the average luminosities of the blocks are Y0=20%, Y1=35%, Y2=50%, Y3=50%, Y4=35%, and Y5=20%, respectively. Here, with respect to Y2 and Y3, the average luminance level of the current frame has risen greater than or equal to twice the average luminance level of the frame one frame previous, and thus the comparators 67 and 68 output "1"; however, the other comparators output "0". Accordingly, the determination unit 71 outputs "0", resulting in the imaging apparatus 2000 not detecting a flash. In other words, in this case, the imaging apparatus 2000 does not mistakenly detect a flash.

Next, as shown in FIG. 12C, in the case where more than 64 lines in the lowermost area of the screen in the frame image experience a high luminance due to a high-luminance object further moving at a high speed, the average luminance levels of the blocks are Y0=20%, Y1=60%, Y2=80%, Y3=80%, Y4=60%, and Y5=20%, respectively; as a result, with respect to Y1 to Y4, the average luminance level of the current frame rises greater than or equal to twice the average luminance level of the frame one frame previous, and the comparators 66 to 69 output "1". However, because the comparators 65 and 70 output "0", the determination unit 71 outputs "0" as well. In other words, the imaging apparatus 2000 determines that a flash has not been detected, and thus a mistaken detection does not occur.

As described thus far, if the average luminance is monitored employing the entire screen of the frame image as the flash detection region, non-responses, in which a flash cannot be detected despite a flash actually occurring, occur, but with the imaging apparatus 2000 according to the second embodiment, non-responses (mistaken determinations of a flash detection) can be reduced. In addition, when the line average luminance is monitored employing only a single line in the lowermost area of the screen in a frame image as the flash detection region, mistaken detections are made due to sensitive responses to the movement of a subject; however, with the imaging apparatus 2000 according to the second embodiment, mistaken detections can be reduced, and mistaken detections can be reduced even in the case where a high-luminance object is moving at a high speed. Accordingly, with the imaging apparatus 2000 of the second embodiment, the flash detection accuracy can be improved beyond conventional flash detection methods.

As described thus far, with the imaging apparatus 2000 according to the second embodiment, six flash detection regions (division block regions) of 64 lines in the lowermost area of the screen in a frame image are provided, the average luminosities of the blocks are monitored, and the block average luminosities of the current frame are compared with the corresponding block average luminosities of the frame one frame previous, for all of the blocks; when the average luminosities of the current frame are greater than or equal to twice the block average luminosities of the frame one frame previous, a flash is determined to have been detected (a flash is determined to have occurred). Through this, with the imaging apparatus 2000, the occurrence of mistaken detections, non-responses, and so on in the flash detection can be reduced. In addition, because the arithmetic mean of the images in two sequential frames in which there has been a flash is found, the image outputted by the imaging apparatus 2000 is not an unnatural image in which the brightness differs between an upper area and a lower area of the screen in the frame image, and is instead an image that is uniformly bright at the instant of the flash.

The imaging apparatus 2000 according to the present embodiment has been described assuming the case where six flash detection regions (division block regions) of 64 lines in the lowermost area of the screen in a frame image are provided, the average luminosities of the blocks are monitored, the block average luminosities of the current frame are compared with the corresponding block average luminosities of the frame one frame previous, for all of the blocks, and when the average luminosities of the current frame are greater than or equal to twice the block average luminosities of the frame one frame previous, a flash is determined to have been detected (a flash is determined to have occurred); however, it should be noted that the invention is not limited thereto, and in the imaging apparatus 2000, the flash detection region setting may be changed to 32 lines, 128 lines, or the like in the lowermost area of the screen in the frame image. In this case as well, mistaken detections of a flash can be reduced beyond the case where a single line in the lowermost area of the frame image is employed as the flash detection region. Furthermore, with the imaging apparatus 2000, even if a flash is determined to be detected (a flash is determined to have occurred) when the block average luminance of the current frame is greater than or equal to 1.5 times the block average luminance of the frame one frame previous for all of the blocks, non-responses are nevertheless reduced more than the case where flashes are detected by monitoring the average luminance of the entire screen of the frame image, and thus the flash detection accuracy is improved. Furthermore, in the imaging apparatus 2000, the same effects can be achieved even if the number of divisions of the flash detection region is "8" rather than "6".

Although the above embodiment describes a case where the number of divisions of the flash detection region is "6", the invention is not limited thereto, and a number other than "6" may be used for the number of divisions of the flash detection region.

Other Embodiments

Note that the various blocks of the imaging apparatus described in the aforementioned embodiments may be implemented as single individual chips by employing semiconductor devices such as LSIs, or some or all of the blocks may be implemented as a single chip.

Note that although the term "LSI" is used here, other names, such as IC, system LSI, super LSI, ultra LSI, and so on are used depending on the degree of integration.

Further, the manner in which the circuit integration is achieved is not limited to LSIs, and it is also possible to use a dedicated circuit or a general purpose processor. FPGAs (Field Programmable Gate Arrays) that can be programmed after the LSI manufacture, reconfigurable processors in which the connections, settings, and so on of circuit cells within the LSIs can be reconfigured, or the like may be used as well.

Furthermore, if other technologies that improve upon or are derived from semiconductor technology enable integration technology to replace LSIs, then naturally it is also possible to integrate the functional blocks using that technology. Biotechnology applications are one such foreseeable example.

In addition, the various processes in the aforementioned embodiments may be achieved as hardware, or as software (this includes implementations through an OS (operating system), middleware, or a predetermined library). These processes may also be implemented through processes in which the software and hardware run integrated with one another. It goes without saying that it is necessary to adjust the timing at which to execute each process in the case where the imaging apparatus according to the above embodiments is implemented through hardware. For simplicity's sake, the descriptions in the above embodiments have omitted the details regarding the adjustment of the timing of the various signals that arises in the actual hardware architecture.

In addition, the order of execution in the processing methods of the aforementioned embodiments are not necessarily limited to the descriptions in the aforementioned embodiments, and the order of execution can be interchanged without departing from the spirit of the invention.

(Appendix)

Note that the present invention can be achieved as described below.

A first invention is an imaging apparatus that includes an imaging unit and a determination unit.

The imaging unit includes a CMOS-type image sensor and obtains an image by converting light from a subject into an electrical signal. The determination unit sets a predetermined region in the lower portion of the image obtained by the imaging unit as a flash detection monitoring region, calculates an evaluation value from the flash detection monitoring region, and determines that the influence of a flash is present within the image when the calculated evaluation value has changed by greater than or equal to a predetermined value.

According to this imaging apparatus, the determination unit sets a predetermined region in the lower portion of the image as the flash detection monitoring region, calculates an evaluation value from the flash detection monitoring region, and determines that the influence of a flash is present within the image when the calculated evaluation value has changed by greater than or equal to a predetermined value; therefore, mistaken detections and non-responses with respect to outside flashes of light can be reduced, and the accuracy of flash detection can be increased.

Note that an "image" is an entity of which a single screen can be composed in a display apparatus, and a frame image, for example, corresponds thereto.

Meanwhile, the "lower portion of the image" is a concept that includes an image region that is below the lower half of the image, and, for example, an image region below the lower half of the image that includes a single line in the lowermost area of the image corresponds thereto.

Furthermore, "evaluation value" is a physical amount expressing the state of the flash detection monitoring region, and is, for example, an average signal level or a signal level integrated value, an average luminance level or a luminance level integrated value, the average value of the signal levels for each of the RGB components, the average value or integrated value of all or some of the signal levels of an RGB component signal, or the like in the flash detection monitoring region.

Finally, "change" is a concept that refers to changes between images, and includes, for example, changes occurring between frame images. For example, the change between the evaluation value of an Nth frame image (where N is an integer) and the evaluation value of the N+1th frame image, which is the next frame, is an example of this "change".

A second aspect is the first aspect, in which the determination unit sets a region configured of a predetermined number of lines that includes the lowermost line of the image as the flash detection monitoring region.

According to this imaging apparatus, a region configured of a predetermined number of lines including the lowermost line in the image (the line located at the lowest position among the lines of which an active screen is composed), which is the most susceptible to the influence of an outside flash of light, is set as the flash detection monitoring region, and it is thus possible to detect the influence of an outside flash of light with more accuracy.

Note that with this imaging apparatus, the flash detection monitoring region is set, for example, as a region configured of sequential lines that includes the lowermost line. For example, with this imaging apparatus, in the case where the image screen is configured of 1,080 lines, the flash detection monitoring region is set to a region of 64 lines in the lower area of the screen, from the 1,017th line to the 1,080th line.

A third aspect is the first or the second aspect, in which the determination unit divides the flash detection monitoring region into n regions (where n is an integer greater than or equal to 2), calculates a dividing region evaluation value for each of the n regions obtained through the dividing, monitors an amount of change in all or some of the calculated n dividing region evaluation values, and determines the presence/absence of the influence of a flash within the image based on the amount of change in the dividing region evaluation values in all of the dividing regions among the dividing regions that are being monitored.

According to this imaging apparatus, a more accurate flash detection can be carried out by using the dividing region evaluation values calculated from the dividing regions obtained by dividing the flash detection monitoring region into n regions (where n is an integer greater than or equal to 2).

A fourth aspect is one of the first through third aspects, further including a correction unit that performs a process for correcting the influence of a flash in the image obtained by the imaging unit in the case where the determination unit has determined that the influence of a flash is present within the image.

According to this imaging apparatus, the influence of a flash within the image can be corrected.

A fifth aspect is a flash determination method including an imaging step and a determining step.

In the imaging step, an image is obtained by converting light from a subject into an electrical signal using a CMOS-type image sensor. In the determining step, a predetermined region in the lower portion of the image obtained by the imaging step is set as a flash detection monitoring region, an evaluation value is calculated from the flash detection monitoring region, and it is determined that the influence of a flash is present within the image when the calculated evaluation value has changed by greater than or equal to a predetermined value.

Through this, it is possible to achieve a flash determination method that achieves the same effects as the first aspect.

A sixth aspect is the fifth aspect, in which in the determining step, a region configured of a predetermined number of lines that includes the lowermost line of the image is set as the flash detection monitoring region.

Through this, it is possible to achieve a flash determination method that achieves the same effects as the second aspect.

A seventh aspect is the fifth or the sixth aspect, in which in the determining step, the flash detection monitoring region is divided into n regions (where n is an integer greater than or equal to 2), a dividing region evaluation value is calculated for each of the n regions obtained through the dividing, an amount of change is monitored in all or some of the calculated n dividing region evaluation values, and the presence/absence of the influence of a flash within the image is determined based on the amount of change in the dividing region evaluation values in all of the dividing regions among the dividing regions that are being monitored.

Through this, it is possible to achieve a flash determination method that achieves the same effects as the third aspect.

An eighth aspect is one of the fifth through seventh aspects, further including a correction step of performing a process for correcting the influence of a flash in the image obtained by the imaging unit in the case where it has been determined in the determining step that the influence of a flash is present within the image.

Through this, it is possible to achieve a flash determination method that achieves the same effects as the fourth aspect.

A ninth aspect is a recording medium in which is recorded a program that causes a computer to execute a flash determination method including an imaging step and a determining step.

In the imaging step, an image is obtained by converting light from a subject into an electrical signal using a CMOS-type image sensor. In the determining step, a predetermined region in the lower portion of the image obtained by the imaging step is set as a flash detection monitoring region, an evaluation value is calculated from the flash detection monitoring region, and it is determined that the influence of a flash is present within the image when the calculated evaluation value has changed by greater than or equal to a predetermined value.

Through this, it is possible to achieve a recording medium in which is recorded a program that causes a computer to execute a flash determination method that achieves the same effects as the first aspect.

INDUSTRIAL APPLICABILITY

According to the imaging apparatus of the present invention, in the case where there has been an outside flash of light, it is possible to output an image that is uniformly bright at the instant of the flash, rather than an unnatural image in which the brightness differs between an upper area and a lower area of the screen in the captured image (the frame image), and it is also possible to reduce the occurrence of mistaken detections and non-responses with respect to flashes. Accordingly, the imaging apparatus is effective in nighttime imaging, and particularly in news coverage and the like, and is thus extremely useful in digital cameras, video cameras, and the like that capture sequential images.

What is claimed is:

1. An imaging apparatus comprising:
    an imaging unit that includes a CMOS-type image sensor and obtains an image by converting light from a subject into an electrical signal, the image including an available picture area formed by N effective scanning lines including an uppermost line located at an uppermost position of the available picture area and a lowermost line located at a lowermost position of the available picture area; and
    a determination unit that sets a predetermined region in a lower portion of the image obtained by the imaging unit as a flash detection monitoring region, calculates an evaluation value from the flash detection monitoring region, and determines that an influence of a flash is present within the image when the calculated evaluation value has changed by greater than or equal to a predetermined value,
    wherein the flash detection monitoring region is formed by a predetermined plural number of successive effective scanning lines that (i) are part of the N effective scanning lines and (ii) include the lowermost line of the N effective scanning lines, and
    wherein the predetermined plural number is equal to or less than one-fourth of N.

2. The imaging apparatus according to claim 1, wherein the determination unit divides the flash detection monitoring region into n divided regions, where n is an integer greater than or equal to 2, calculates a divided region evaluation value for each of the n divided regions obtained through the dividing of the flash detection monitoring region, monitors an amount of change in all of the calculated n divided region evaluation values, and determines a presence/absence of the influence of the flash within the image based on the amount of change in the divided region evaluation values in all of the n divided regions.

3. The imaging apparatus according to claim 1, further comprising:
    a correction unit that performs a process for correcting the influence of the flash in the image obtained by the imaging unit in a case where the determination unit has determined that the influence of the flash is present within the image.

4. The imaging apparatus according to claim 1, further comprising a correction unit that performs a process for correcting the influence of the flash by combining the image with a previously obtained image to obtain a corrected image.

5. The imaging apparatus according to claim 4, wherein the corrected image obtained by the correction unit is outputted for two sequential frames.

6. A flash determination method comprising the following steps:
    (a) obtaining an image by converting light from a subject into an electrical signal using a CMOS-type image sensor, the image including an available picture area formed by N effective scanning lines including an uppermost line located at an uppermost position of the available picture area and a lowermost line located at a lowermost position of the available picture area; and
    (b) setting a predetermined region in a lower portion of the image obtained in the step (a) as a flash detection monitoring region, calculating an evaluation value from the flash detection monitoring region, and determining that an influence of a flash is present within the image when the calculated evaluation value has changed by greater than or equal to a predetermined value,
    wherein the flash detection monitoring region is formed by a predetermined plural number of successive effective scanning lines that (i) are part of the N effective scanning lines and (ii) include the lowermost line of the N effective scanning lines, and
    wherein the predetermined plural number is equal to or less than one-fourth of N.

7. The flash determination method according to claim 6, wherein the step (b) further includes dividing the flash detection monitoring region into n divided regions, where n is an integer greater than or equal to 2, calculating a divided region evaluation value for each of the n divided regions obtained through the dividing of the flash detection monitoring region, monitoring an amount of change in all of the calculated n divided region evaluation values, and determining a presence/absence of the influence of the flash within the image based on the amount of change in the divided region evaluation values in all of the n divided regions.

8. The flash determination method according to claim 6, further comprising a step of:
    (c) performing a process for correcting the influence of the flash in the image obtained by the step (a) in a case where the step (b) determines that the influence of flash is present within the image.

9. The flash determination method according to claim 6, further comprising a step of (c) performing a process for correcting the influence of the flash by combining the image with a previously obtained image to obtain a corrected image.

10. The flash determination method according to claim 9, further comprising a step of (d) outputting the corrected image obtained in the step (c) for the sequential frames.

11. A non-transitory computer-readable recording medium having a program recorded thereon, the program for causing a computer to execute a flash determination method, the flash determination method comprising the following steps:
    (a) obtaining an image by converting light from a subject into an electrical signal using a CMOS-type image sensor, the image including an available picture area formed by N effective scanning lines including an uppermost line located at an uppermost position of the available picture area and a lowermost line located at a lowermost position of the available picture area; and
    (b) setting a predetermined region in a lower portion of the image obtained in the step (a) as a flash detection monitoring region, calculating an evaluation value from the flash detection monitoring region, and determining that an influence of a flash is present within the image when the calculated evaluation value has changed by greater than or equal to a predetermined value,
    wherein the flash detection monitoring region is formed by a predetermined plural number of successive effective scanning lines that (i) are part of the N effective scanning lines and (ii) include the lowermost line of the N effective scanning lines, and wherein the predetermined plural number is equal to or less than one-fourth of N.

* * * * *